(12) United States Patent
Wada et al.

(10) Patent No.: US 7,916,330 B2
(45) Date of Patent: Mar. 29, 2011

(54) DRIVER SELECTION FOR PRINTER DRAWING CONVERSION

(75) Inventors: Katsuhiro Wada, Kawasaki (JP); Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 11/681,660

(22) Filed: Mar. 2, 2007

(65) Prior Publication Data

US 2007/0216939 A1 Sep. 20, 2007

(30) Foreign Application Priority Data

Mar. 17, 2006 (JP) ................................ 2006-075546

(51) Int. Cl.
G06F 3/12 (2006.01)
G06F 15/00 (2006.01)
(52) U.S. Cl. ..................................... 358/1.15; 358/1.13
(58) Field of Classification Search .................. 358/1.1, 358/1.9, 1.13, 1.14, 1.15, 1.18, 474, 448
See application file for complete search history.

(56) References Cited

U.S. PATENT DOCUMENTS

| | | | |
|---|---|---|---|
| 6,707,568 B1 | 3/2004 | Yu | |
| 7,131,775 B2 | 11/2006 | Uchida et al. | |
| 7,168,868 B2 | 1/2007 | Uchida et al. | |
| 7,253,911 B2 | 8/2007 | Aritomi | |
| 2002/0180822 A1 | 12/2002 | Aritomi | |
| 2004/0223167 A1 | 11/2004 | Yu | |
| 2004/0263892 A1* | 12/2004 | Uchida | 358/1.13 |
| 2005/0024671 A1* | 2/2005 | Abe | 358/1.13 |
| 2005/0088701 A1 | 4/2005 | Uchida et al. | |
| 2005/0141013 A1 | 6/2005 | Kikuchi et al. | |
| 2006/0066907 A1 | 3/2006 | Nakata et al. | |
| 2006/0147236 A1 | 7/2006 | Uchida et al. | |
| 2007/0174521 A1 | 7/2007 | Aritomi | |

FOREIGN PATENT DOCUMENTS

JP 11-184656 9/1999
JP 2001154821 6/2001

OTHER PUBLICATIONS

Emerson, Daniel, "Advances in Window Printing", Microsoft Corp., http:www.microsoft.com/whdc/device/print/default.mspx (Advances in Windows Printing: TWPR05001_WinHEC05.ppt), WinHEC Seattle, 2005.
Office Action, dated Sep. 23, 2008, in KR 10-2007-0025949.
Office Action, dated Jun. 12, 2009, in EP 07 10 4038.

(Continued)

*Primary Examiner* — Gabriel I Garcia
(74) *Attorney, Agent, or Firm* — Fitzpatrick, Cella, Harper & Scinto

(57) ABSTRACT

An information processing apparatus which has a first drawing conversion unit which converts first drawing information generated by an application of a first type into first print information which can be processed by a printer driver of a first type, and a second drawing conversion unit which converts second drawing information generated by an application of a second type into second print information which can be processed by a printer driver of a second type, includes a determination unit which determines the type of application as an output source with respect to the printer driver as an output destination, a detection unit which detects printer drivers which match the type of application from installed printer drivers, and a display control unit which displays printer drivers on a display for selecting a printer driver as the output destination of the application.

26 Claims, 22 Drawing Sheets

OTHER PUBLICATIONS

XP-002416202, Windows Graphics Programming Win32 and DirectDraw, Chapters 2 and 4, Jan. 23, 2007.
"Advances in Windows Printing: TWPR05001_WinHEC05.ppt)", http://www.microsoft.com/whdc/device/print/default.mspx, Jan. 2007.

* cited by examiner

FIG. 14

| APPLICATION | APPLICATION OPERATION MODE | DEFAULT PRINTER |
|---|---|---|
| MEMO PAD | WinFx APPLICATION | iR 3300 (XPS) - PrintSrver01 |
| MEMO PAD | Win32 APPLICATION | iR 5000 (GDI) - PrintSrver02 |
| FORM PRINTING APPLICATION | WinFx APPLICATION | iR 3300 (XPS) |
| FORM PRINTING APPLICATION | Win32 APPLICATION | iR C 3200 (GDI) |
| PAINT | WinFx APPLICATION | iR 3300 (XPS) |
| PAINT | Win32 APPLICATION | iR 6000 (GDI) |

FIG. 15

| APPLICATION OPERATION MODE | DEFAULT PRINTER |
|---|---|
| WinFx APPLICATION | iR 5000 (XPS) - PrintSrver01 |
| Win32 APPLICATION | iR 5000 (GDI) - PrintSrver02 |

DRIVER SELECTION FOR PRINTER DRAWING CONVERSION

BACKGROUND OF THE INVENTION

1. Field of the Invention

The present invention relates to an information processing technique for executing print processing using a plurality of different graphics engines.

2. Description of the Related Art

An arrangement shown in FIG. 1 is generally used when printing image and text data from an application on a host computer 3000 using a printer 1500. An application 101 passes drawing data to a graphics engine 103, which processes the drawing data and passes it to a printer driver 104. The printer driver 104 generates print data (generally, PDL, Page Description Language data) for the printer 1500, and stores the print data in a spooler 105. Then, the print data is sent to the printer 1500. In particular, the graphics engine 103 executes processing of the drawing data (e.g., conversion of the resolution of drawing data generated by the application 101, simulation processing in correspondence with the processing capacity of the printer driver 104, and the like). Thus, the application 101 and printer driver 104 can operate independently. This graphics engine 103 is normally provided as a part of an OS (Operating System) 102.

Furthermore, the number of graphics engines is not limited to one, and an arrangement that includes two or more graphics engines is available. For example, in 2005 Microsoft Corporation organized the hardware engineering conference "WinHEC 2005" in Seattle, U.S.A. Daniel Emerson, "Advances in Windows Printing", WinHEC 2005 Conference, April 2005, at which Microsoft announced its latest OS (Windows® Vista) adopts an arrangement in which two graphics engines coexist, as shown in FIG. 2.

Conventionally, an application (Win32 application) 201 that uses an API (Application Program Interface) (i.e., Win32 API) leverages a graphics engine 202 called a GDI (Graphic Device Interface). A printer driver (GDI printer driver) 203 called from the GDI 202 generates print data based on drawing data. This print processing flow will be referred to as a GDI print path hereinafter.

Windows® Vista adds a new print processing flow called an XPS (XML Paper Specification) print path in addition to the conventional GDI print path. The XPS print path leverages a graphics engine 212 called a WPF (Windows® Presentation Foundation) from an application (WinFx application) 211 that uses a WinFx API. A printer driver (XPS printer driver) 213 converts drawing data in an XPS (XML Paper Specification) format into print data.

Furthermore, graphics engines such as the GDI 202 and WPF 212 can cooperate with each other. With this cooperation, the Win32 application 201 can pass drawing data to the XPS printer driver 213, and the WinFx application 211 can pass drawing data to the GDI printer driver 203.

FIG. 3 shows cooperation between the two graphics engines in Windows® Vista. A print processing flow (1) indicates the conventional GDI print path. The GDI 202 stores drawing data passed from the Win32 application 201 as an EMS spool file 301 having an EMF (Enhanced Metafile) format. After that, the GDI printer driver 203 converts the stored drawing data into print data.

A print processing flow (4) indicates the XPS print path added in Windows® Vista. The WPF 212 stores drawing data passed from the WinFx application 211 as an XPS spool file 311. After that, the XPS printer driver 213 converts the stored drawing data into print data. In this way, the print processing flows (1) and (4) will be referred to as straight print paths hereinafter.

A print processing flow (3) is used on printing data from the WinFx application 211 by the GDI printer driver 203. An XPS→CDI conversion module 312 converts drawing data passed from the WinFx application 211 into that of the EMF format via the WPF 212, and stores the converted data as an EMF spool file 301. After that, the GDI printer driver 203 converts the stored data into print data.

A print processing flow (2) is used on printing data from the Win32 application 201 by the XPS printer driver 213. A GDI→XPS conversion module 302 converts drawing data passed from the Win32 application 201 into that of the XPS format via the CDI 202, and stores it as an XPS spool file 311. After that, the XPS printer driver 213 converts the stored data into print data. In this way, the print processing flows (2) and (3) will be referred to as cross print paths hereinafter.

As described above, in Windows® Vista, four print processing flows are prepared. A printer can cope with print processing from both a Win32 application and a WinFx application by preparing either one of the GDI printer driver 203 or XPS printer driver 213.

The above prior art is described in, for example, Japanese Patent Laid-Open No. 2001-154821.

However, since the XPS and EMF formats are different, the print processing flows that require conversion of drawing data like the print processing flows (2) and (3) present problems for print quality, functionality, and print speed.

Regarding print quality problems, for example, in the print processing flow (2), the XPS format does not support drawing data including logical operations such as ROP (raster operation processing) operations, which are supported by the EMF format. For this reason, depending on the specification determined by Microsoft Corporation, logical operation information may be excluded from such drawing data upon conversion by the GDI→XPS conversion module 302. In this case, since drawing data from which the logical operation information is discarded is passed to the XPS printer driver 312, the XPS printer driver 312 cannot generate the output result that the Win32 application 201 intended.

Conversely, in the print processing flow (3), the EMF format does not support the advanced graphics drawing data supported by the XPS format. For this reason, local bitmap conversion called "Flattering" is applied to such drawing data upon conversion by the XPS→GDI conversion module 312. In this case, since graphics data is converted into bitmap data, the GDI printer driver 203 cannot discriminate original object attributes, and cannot generate an optimal output result. For example, upon executing N-page printing by the printer driver, since bitmap data are laid out in a reduced size, the image quality deteriorates compared to the case wherein graphics drawing objects are drawn in a reduced size.

As for printing functionality, for example, in the print processing flow (3), the EMF format does not support electronic signature information supported by the XPS format. Further, the XPS format does not support processing which directly sends information from an application to the GDI printer driver 203, however, this is supported by the EMF format in the print processing flow (2). For this reason, even when an application uses functions which can be supported by print processing flows (1) and (4), such functions cannot be implemented by print processing flows (2) and (3).

Note that a print mode via the straight print path by print processing systems (to be referred to as "print processing flows" hereinafter) (1) and (4) will be referred to as a native print mode hereinafter, and a printer driver using such a mode will be referred to as a native driver hereinafter. A print mode implemented via the cross print path using print processing flows (2) or (3) will be referred to as a non-native print mode, and a printer driver using such a mode will be referred to as a non-native driver hereinafter.

As for the print speed, since GDI→XPS conversion or XPS→GDI conversion occurs in the print processing flow (2) or (3), the print processing speed is reduced compared to the print processing flow (1) or (4).

For this reason, avoiding print processing flows (2) and (3) is desirable. However, even when both the XPS printer driver and GDI printer driver are registered for a single printer, the graphics engine in Windows® Vista does not dynamically switch the processing to preferentially select print processing flow (1) or (4). Furthermore, the user basically does not distinguish between Win32 and WinFx applications and does not recognize the four different types of print processing flows. For this reason, upon execution of print processing, it is difficult to avoid print processing flows (2) and (3), and it is also difficult to use the native driver as an optimal combination with the application.

It is an object of the present invention to provide an information processing technique that allows selection of a printer driver suited to an application in an arrangement in which a plurality of graphics engines exist together, and in which printer drivers of different graphics engines can be installed.

SUMMARY OF THE INVENTION

According to an aspect of the invention, the foregoing object is attained by providing an information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, comprising:

a determination unit configured to determine a type of application of the first type or the second type as output source with respect to the printer driver of the first type or the second type as an output destination of the first print information or the second print information;

a detection unit configured to detect printer drivers which match the type of application of the first type or the second type, determined by the determination unit, from printer drivers of the first type and printer drivers of the second type, which are installed in the information processing apparatus; and a display control unit configured to display the printer drivers detected by the detection unit on a display for selecting a printer driver as the output destination of the application of the first type or the second type as the output source.

According to another aspect of the present invention, the foregoing object is attained by providing an information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, comprising:

a setting unit configured to set a default printer driver;

a determination unit configured to determine a type of application of the first type or the second type as output source with respect to the printer driver of the first type or the second type as an output destination of the first print information or the second print information;

a detection unit configured to detect the default printer driver set by the setting unit with respect to the application of the first type or the second type determined by the determination unit; and a display control unit configured to select and display the printer driver detected by the detection unit on a display for selecting a printer driver as the output destination of the application of the first type or the second type as the output source.

According to the present invention, in an arrangement in which a plurality of graphics engines exist together, and printer drivers of different graphics engines can be installed, a printer driver suited to an application can be easily selected.

Further features of the present invention will become apparent from the following description of exemplary embodiments with reference to the attached drawings.

BRIEF DESCRIPTION OF THE DRAWINGS

FIG. 14 shows a save example of application-dependent default printer drivers which are used upon printing;

FIG. 15 shows a save example of graphics engine-dependent default printer drivers which are used upon printing;

DESCRIPTION OF THE EMBODIMENTS

First Embodiment

An information processing apparatus according to the first embodiment will now be described.

Figure 20A:
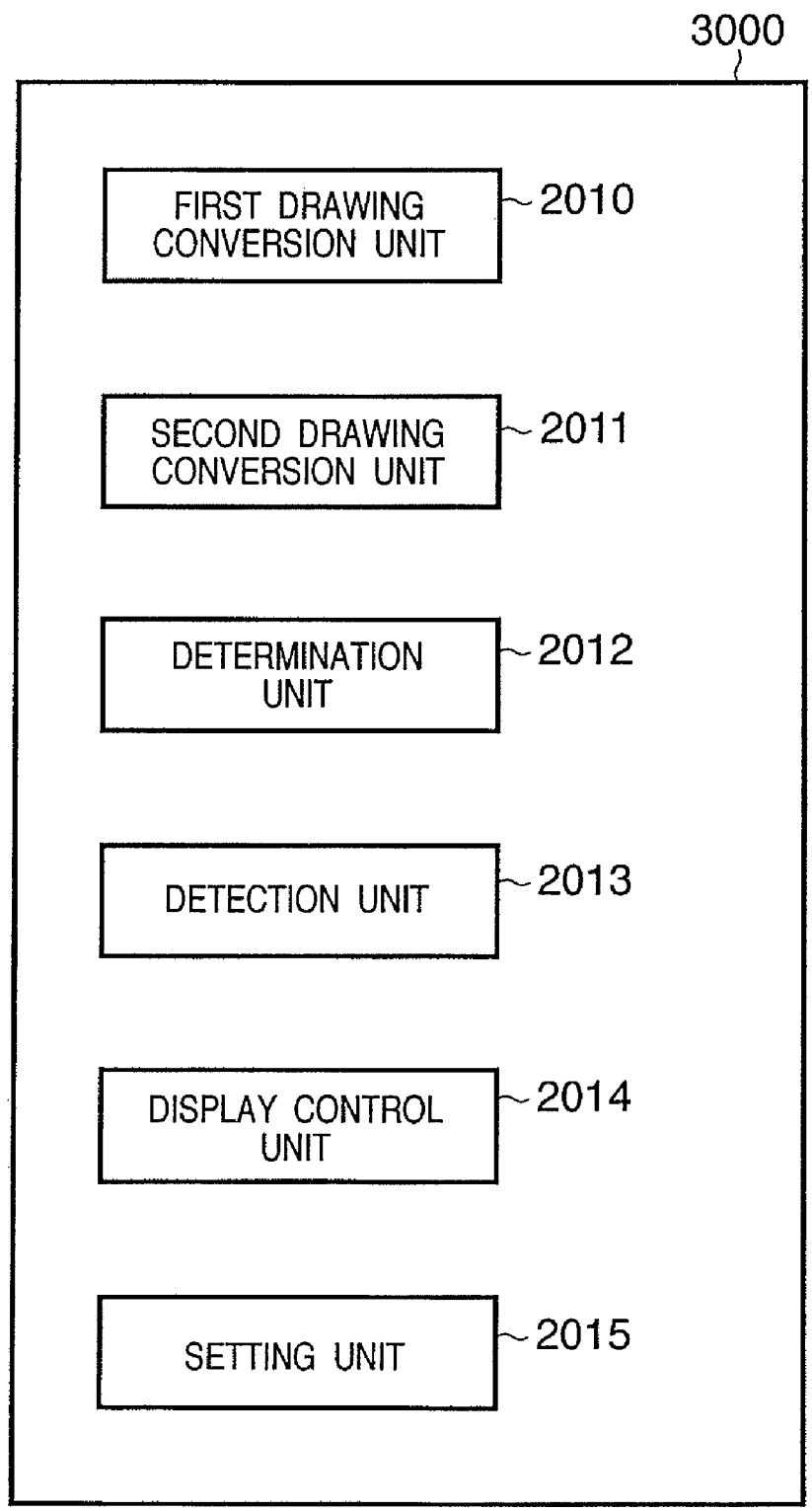
FIGS. 20A and 20B are diagrams showing the functional arrangement of an information processing apparatus according to one embodiment of the present invention.

An information processing apparatus 3000 suited to this embodiment comprises a functional arrangement shown in FIG. 20A. A first drawing conversion unit 2010 converts a first type of drawing information generated by an application of the first type into a first type of print information which can be processed by a printer driver of the first type.

A second drawing conversion unit 2011 converts a second type of drawing information generated by an application of the second type into a second type of print information which can be processed by a printer driver of the second type.

A determination unit 2012 determines the type of the application of the first or second type as an output source with respect to the printer driver of the first or second type as an output destination of the first or second print information.

A detection unit 2013 detects a printer driver that matches the type of the application of the first or second type determined by the determination unit 2012 from printer drivers of the first and second types which are installed in the information processing apparatus.

A display control unit 2014 indicates or displays the printer driver detected by the detection unit 2013 on a display window used to select a printer driver as an output destination of the application of the first or second type as the output source.

A setting unit 2015 sets a display condition required to indicate or display the printer driver detected by the detection unit on the display window.

Figure 4:
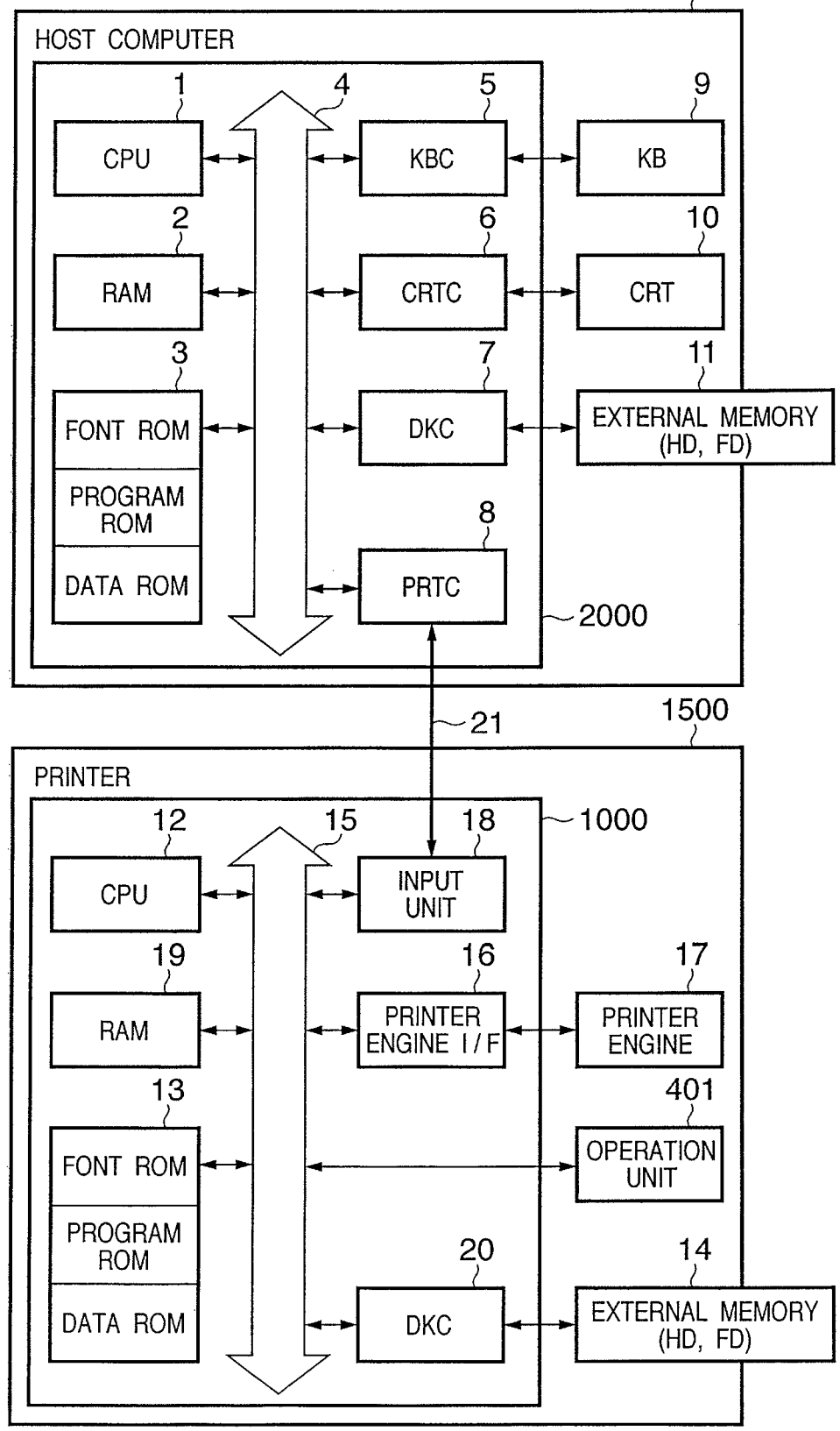
FIG. 4 is a block diagram for explaining the arrangement of an information processing system including an information processing apparatus and a printer.

FIG. 4 is a block diagram for explaining the arrangement of an information processing system which includes the information processing apparatus (to be referred to as "host computer" hereinafter) 3000 and a printer 1500.

(Arrangement of Host Computer 3000)

Referring to FIG. 4, a CPU 1 of the host computer 3000 can execute document processing based on a document processing program and the like stored in a program ROM of a ROM 3 or an external memory 11. The CPU 1 can execute document processing on data that includes graphics data, image data, text data, table data (including a spreadsheet), and the like together, and can systematically control devices connected to a system bus 4.

The program ROM of the ROM 3 or the external memory 11 stores an operating system program (to be referred to as "OS" hereinafter) as a control program of the CPU 1. A font ROM of the ROM 3 or the external memory 11 stores font data and the like used upon execution of the document processing, and a data ROM of the ROM 3 or the external memory 11 stores various data used upon execution of the document processing.

A RAM 2 serves as a main memory and work area of the CPU 1. Reference numeral 5 denotes a keyboard controller (KBC), which controls key inputs from a keyboard 9 and a pointing device (not shown). Reference numeral 6 denotes a CRT controller (CRTC), which controls display on a CRT display (CRT) 10. Other display means can be used as an alternative.

The external memory 11 such as a hard disk (HD), flexible disk (FD), etc., stores a boot program, various applications, font data, printer control command generation programs (printer drivers), and the like.

A disk controller (DKC) 7 controls access to the external memory 11. Reference numeral 8 denotes a printer controller (PRTC), which is connected to the printer 1500 via a predetermined two-way interface 21, and executes communication control processing with the printer 1500. Note that the CPU 1 executes rasterize processing of outline fonts on a display information RAM assured on, e.g., the RAM 2 to implement a WYSIWYG environment on the CRT 10.

The CPU 1 opens various registered windows based on commands given by a mouse cursor or the like (not shown) on the CRT 10, and executes various kinds of data processing. Upon execution of printing, the user opens a window associated with print settings, and can set a printer and a print processing method for a printer driver as well as selection of a print mode.

(Arrangement of Printer 1500)

A CPU 12 of the printer 1500 outputs an image signal as output information to a printer engine 17 connected to a system bus 15 based on a control program and the like stored in a program RON of a ROM 13 or an external memory 14.

The program ROM of the ROM 13 stores a control program and the like of the CPU 12. A font ROM of the ROM 13 stores font data and the like used upon generating output information. A data ROM of the ROM 13 can store information and the like used on the host computer in the case of a printer which has no external memory 14 such as a hard disk or the like.

The CPU 12 can execute communication processing with the host computer 3000 via an input unit 18, and can send information and the like in the printer 1500 to the host computer 3000. A RAM 19 serves as a main memory, work area, and the like of the CPU 12, and can expand its memory capacity by an option RAM connected to an expansion port (not shown) Note that the RAM 19 can also be used as an output information rasterize area, environmental data storage area, NVRAM, and the like. A disk controller (DKC) 20 controls access to the external memory 14 such as a hard disk (HD), IC card, or the like.

The optional external memory 14 stores font data, emulation programs, form data, and the like. On the input unit 18, switches, LED indicators, and the like used to operate the printer 1500 are arranged. The number of external memories 14 is not limited to one, so that one or more external memories 14 may be connected. A plurality of external memories including an option font card in addition to built-in font data, an external memory which stores a program that interprets a printer control language of a different language system, and the like may be connected. Furthermore, the printer 1500 may comprise an NVRAM (not shown), and may store printer mode setting information from an operation unit 401.

(Description of Print Paths)

Figure 1:
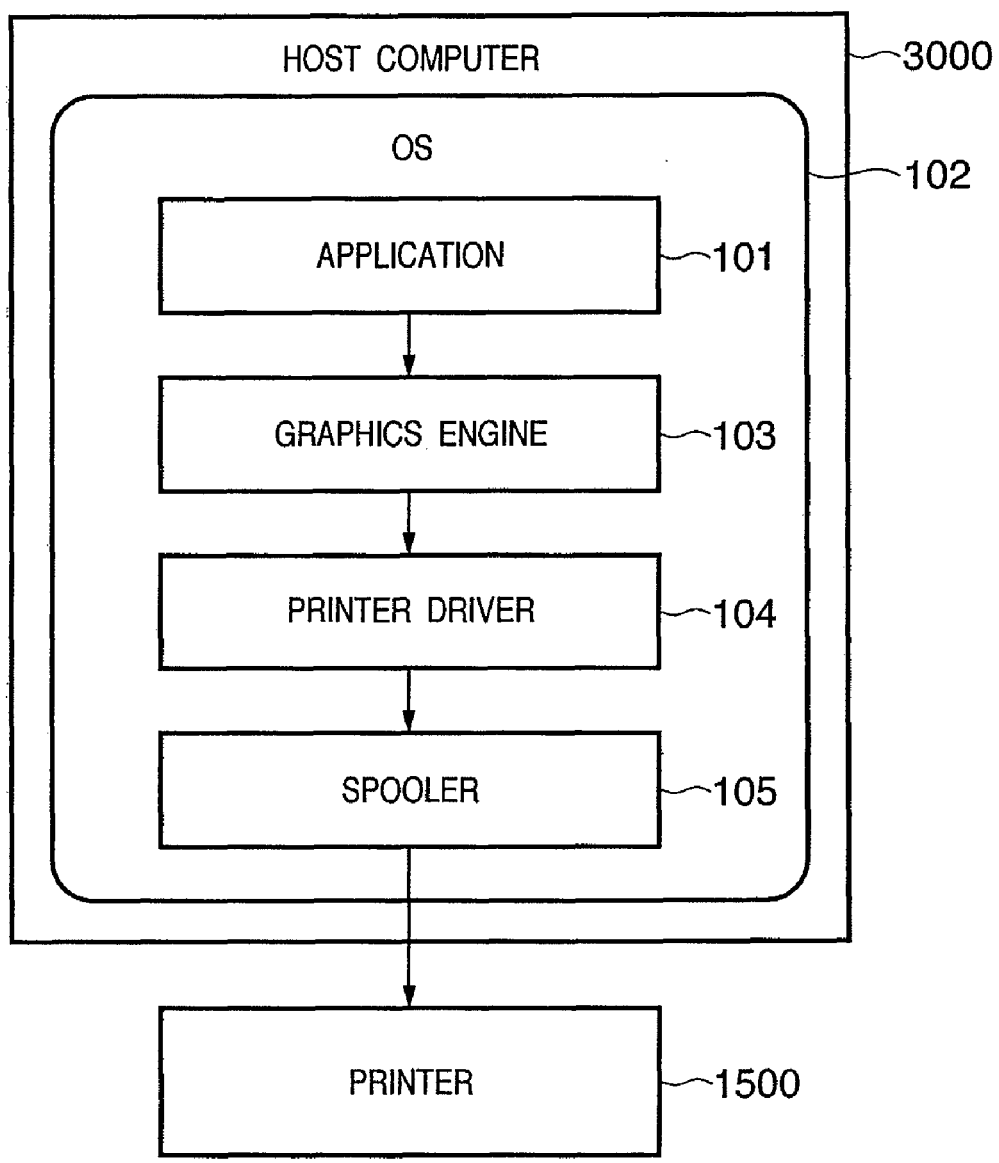
FIG. 1 is a diagram for explaining general print processing flows.
Figure 2:
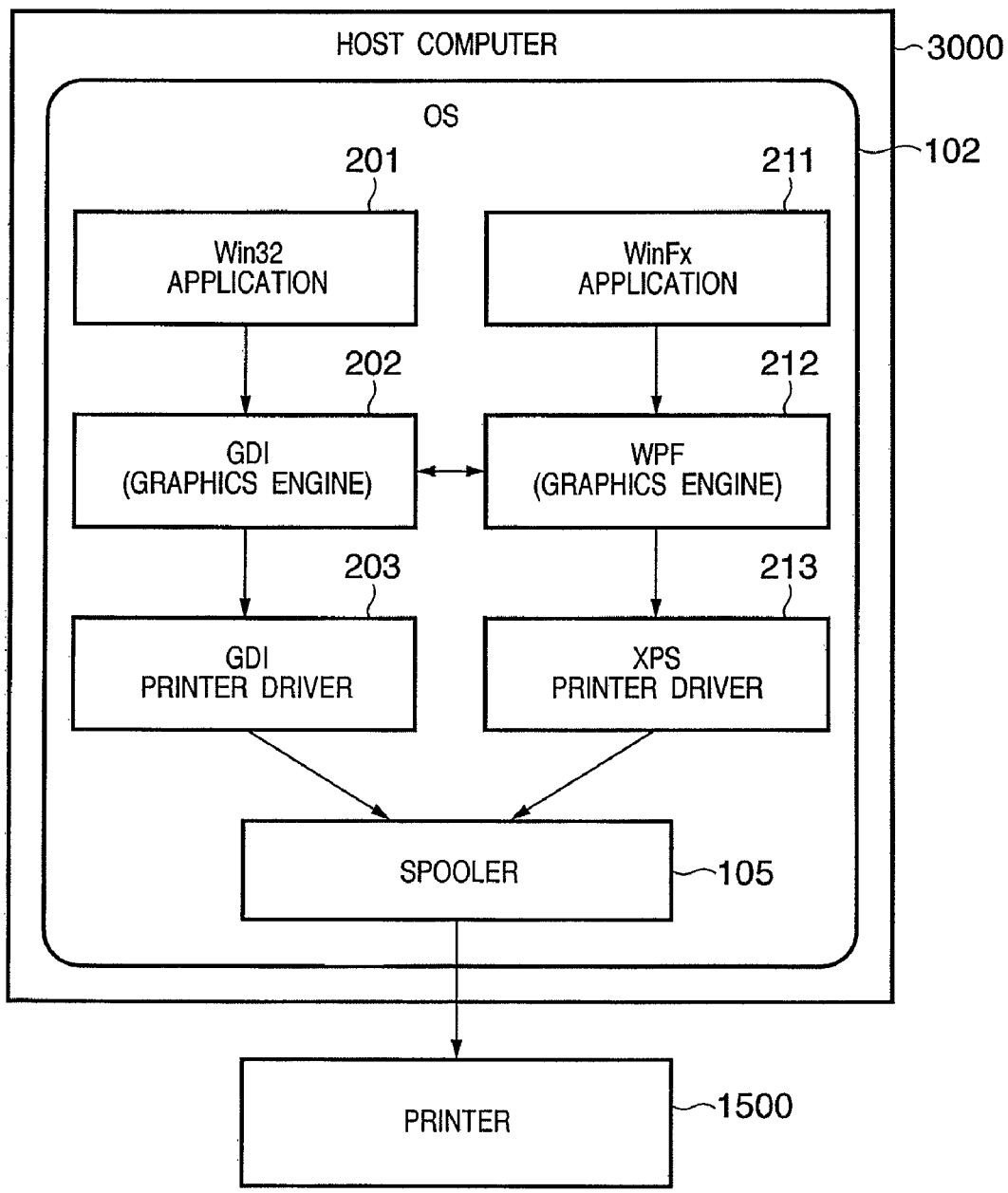
FIG. 2 is a diagram for explaining print processing flows when a plurality of graphics engines coexist.
Figure 3:
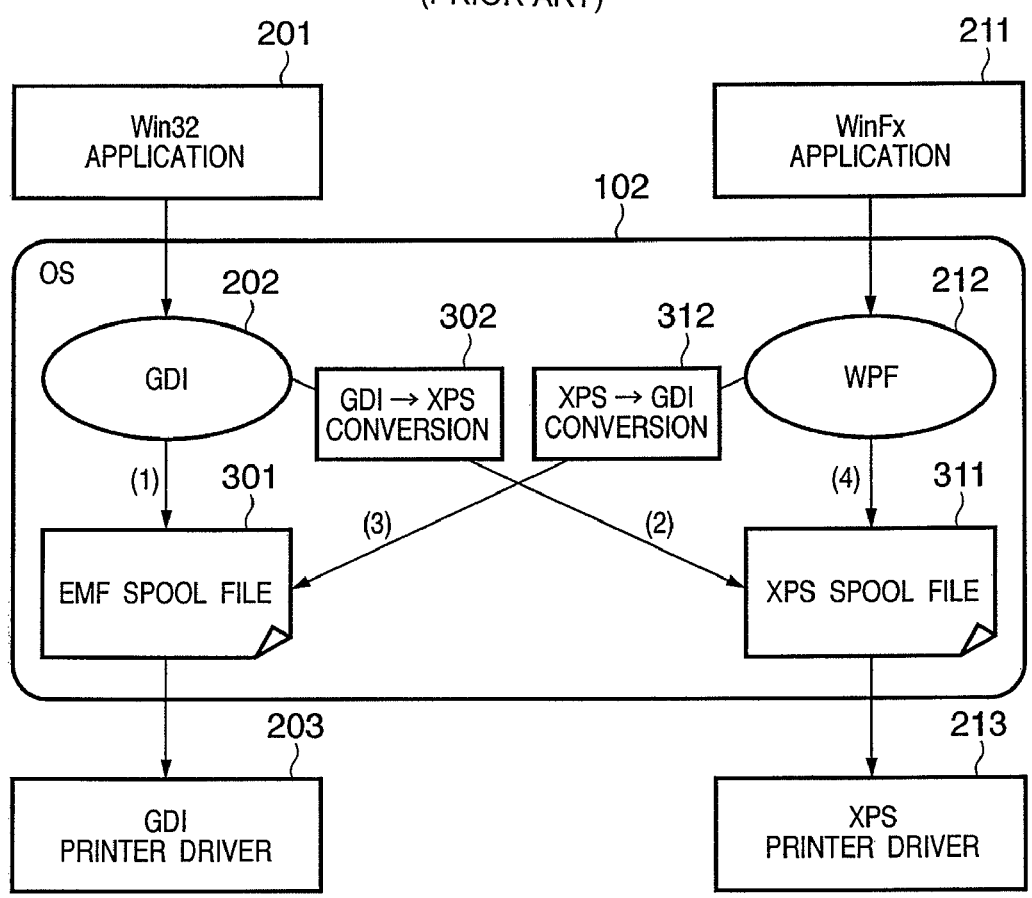
FIG. 3 is a diagram for explaining print processing flows when a plurality of graphics engines coexist.

Print paths in the information processing apparatus according to the first embodiment of the present invention will be described below. The information processing apparatus of this embodiment allows two graphics engines to run in Windows® Vista, as has been explained using FIG. 3.

As described above, in the print processing flow (1), the Win32 application 201 as an application of the first type outputs drawing information of the first type (GDI (Graphic Device Interface) functions). The GDI graphics engine 202 stores the drawing information of the first type as an EMF spool file 301 of the EMF (Enhanced Metafile) format, and converts the stored information into second print information (DDI (Device Driver Interface) functions) which can be processed by a printer driver as an output destination. After that, the GDI printer driver 203 as a printer driver of the first type converts the second print information into print data.

Next, the print processing flow (4) indicates an XPS print path added in Windows® Vista. The WPF graphics engine 212 receives drawing information of the second type (WPF API information) passed from the WinFx application 211 as an application of the second type, converts it into an XPS spool file 311 as print information of the second type, and stores the converted spool file. After that, the XPS printer driver 213 converts the stored information into print data. In this way, the print processing flows (1) and (4) will be referred to as straight print paths hereinafter.

The print processing flow (3) is used on printing data from the WinFx application 211 by the GDI printer driver 203. An XPS→GDI conversion module 312 converts drawing data passed from the WinFx application 211 into drawing data of the EMF format via the WPF 212, and stores the converted data as an EMF spool file 301. After that, the GDI printer driver 203 converts the stored data into print data.

The print processing flow (2) is used on printing data from the Win32 application 201 by the XPS printer driver 213. A GDI→XPS conversion module 302 converts drawing data passed from the Win32 application 201 into drawing data of the XPS format via the GDI 202, and stores the converted data as an XPS spool file 311. After that, the XPS printer driver 213 converts the stored data into print data. In this way, the print processing flows (2) and (3) will be referred to as cross print paths hereinafter.

In this manner, in Microsoft Windows® Vista suited as an OS which runs on the information processing apparatus of the present invention, the four print processing flows are prepared. A printer can cope with print processing from both the Win32 application and WinFx application by preparing either one of the GDI printer driver 203 and XPS printer driver 213.

(Arrangement of Printer Driver Enumeration Display Application)

Figure 5:
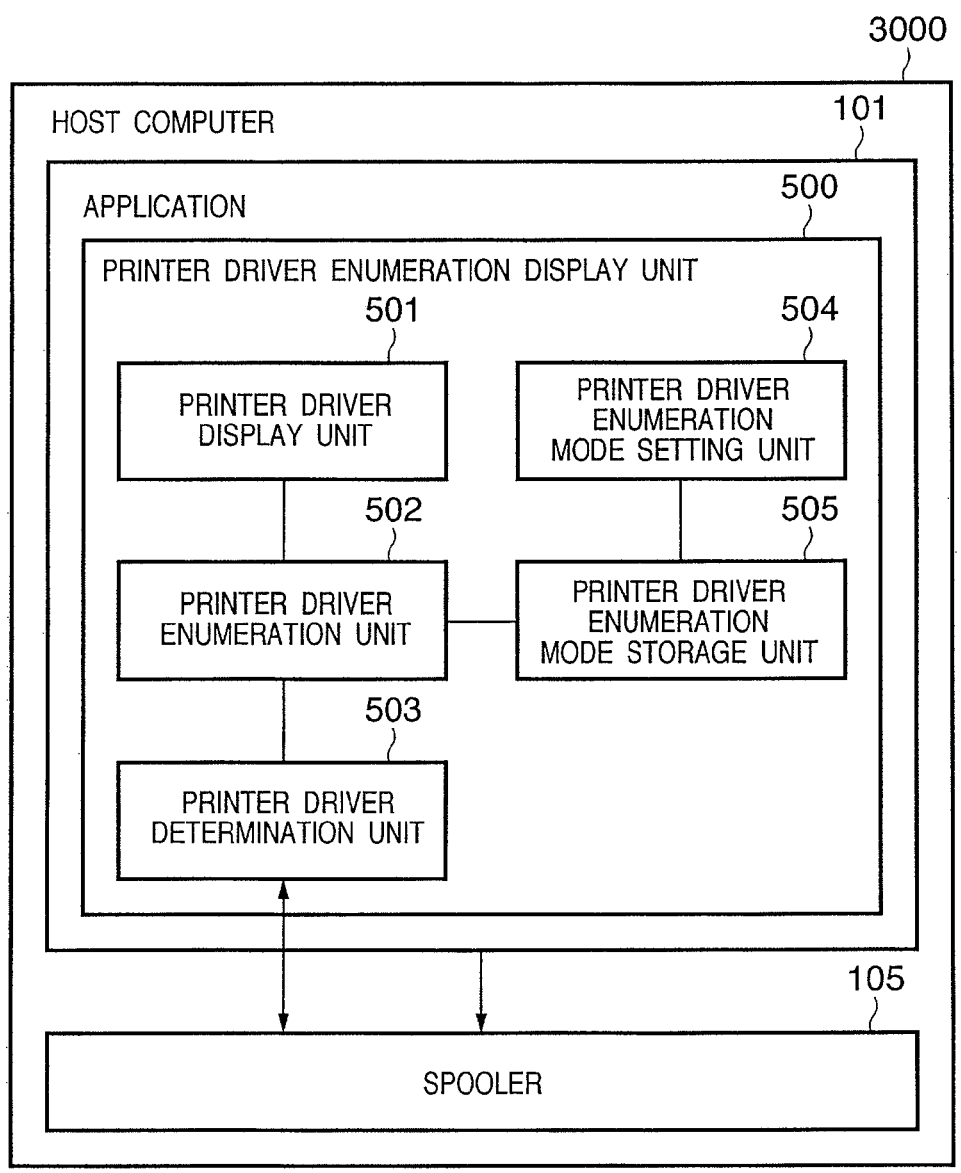
FIG. 5 is a block diagram showing the arrangement of a printer driver enumeration display unit 500.

FIG. 5 is a block diagram showing the arrangement of a printer driver enumeration display application (to be referred to as "printer driver enumeration display unit" hereinafter).

In information processing apparatus which can install printer drivers of different graphics engines, a printer driver enumeration display unit 500 detects printer drivers which match the type of an application, and enumerates the detection results. To implement such a function, the printer driver enumeration display unit 500 comprises the following arrangement.

The printer driver display unit 501 presents printer drivers enumerated by a printer driver enumeration unit 502 to be described below to the user via the CRTC 6 and CRT 10.

The printer driver enumeration unit 502 acquires the types of printer drivers from a printer driver determination unit 503 to be described later. Furthermore, the printer driver enumeration unit 502 acquires display conditions (to be referred to as "enumeration mode" hereinafter) from a printer driver enumeration mode storage unit 505. The printer driver enumeration unit 502 detects suited printer drivers from those installed in the host computer 3000 based on the types of printer drivers and the enumeration mode. Furthermore, the printer driver enumeration unit 502 enumerates and displays the detection results on the CRT 10 by controlling the CRTC 6.

The printer driver determination unit 503 acquires printer driver information from a spooler 105, and determines the types of printer drivers. Since a technique for acquiring printer driver information from the spooler 105 is provided as an API of existing Microsoft Windows®, a detailed description thereof will be omitted.

A printer driver enumeration mode setting unit 504 presents a display method for enumerating and displaying the printer driver detection results to the user, and stores user's settings in the printer driver enumeration mode storage unit 505. The printer driver enumeration mode storage unit 505 stores the enumeration mode set by the user, and passes the stored information to the printer driver enumeration unit 502.

(Processing of Printer Driver Enumeration Mode Setting Unit 504)

The procedure of enumeration mode setting processing which is implemented by the printer driver enumeration mode setting unit 504 in collaboration with the CPU 1 will be described below with reference to the flowchart of FIG. 6.

The printer driver enumeration mode setting unit 504 displays a printer driver enumeration mode setting dialog on the CRT 10 in step S601. Enumeration modes to be displayed on the CRT 10 include a mode for displaying only native drivers of an application, and a mode for displaying printable printer drivers (native and non-native drivers).

In step S602, the printer driver enumeration mode setting unit 504 stores a driver enumeration mode set by a user instruction via the enumeration mode setting dialog displayed in step S601 in the printer driver enumeration mode storage unit 505.

Figure 7:
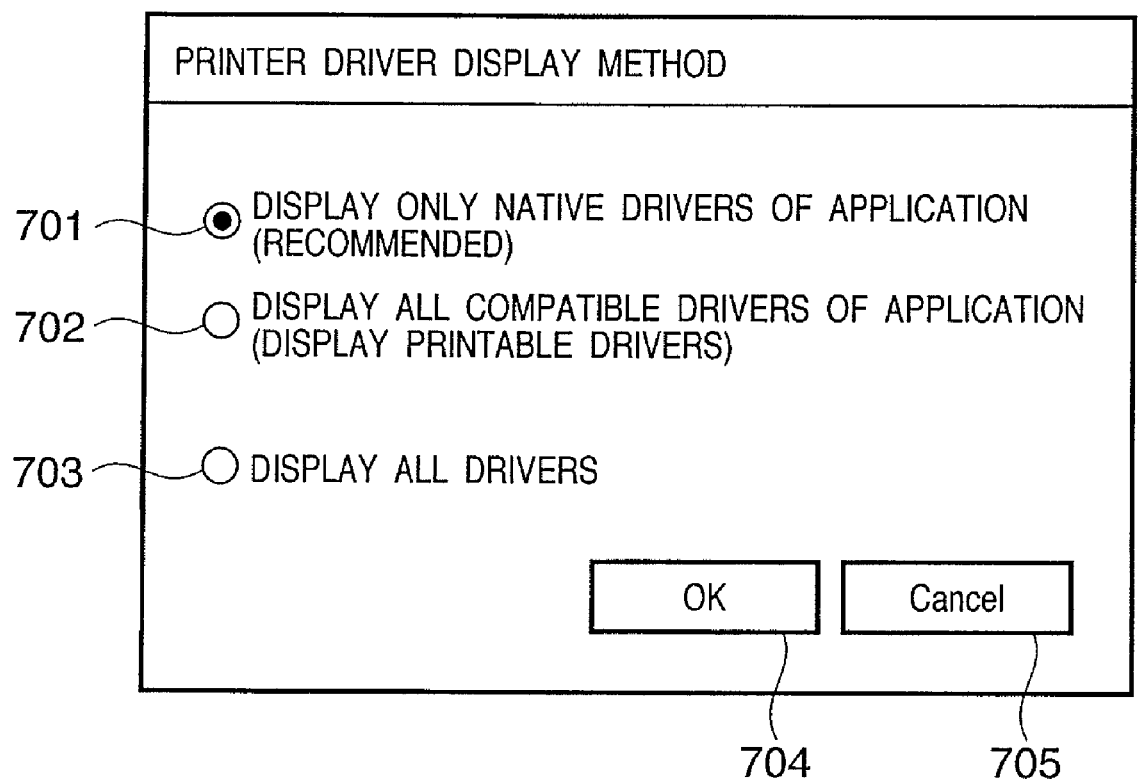
FIG. 7 shows an example of a printer driver enumeration mode setting user interface (enumeration mode setting dialog)

FIG. 7 shows an example of a printer driver enumeration mode setting user interface (enumeration mode setting dialog) displayed by the printer driver enumeration mode setting unit 504 in step S601. This display example displays three different modes: a mode for displaying only native drivers of an application (recommended), a mode for displaying all compatible drivers of an application to display printable drivers, and a mode for displaying all drivers. When the user selects one of buttons 701 to 703 and then presses an OK button 704, the selected display method is set. On the other hand, when the user presses a cancel button 705 before he or she presses the OK button 704, selection of the buttons 701 to 703 is canceled. As the display timing of the setting dialog (FIG. 7) by the printer driver enumeration mode setting unit 504 can be set, that dialog can be displayed prior to detection of printer drivers and enumeration of detection results. The user can display the setting dialog and can select the enumeration mode at an arbitrary timing.

(Processing of Printer Driver Enumeration Display Unit 500)

Figure 8:
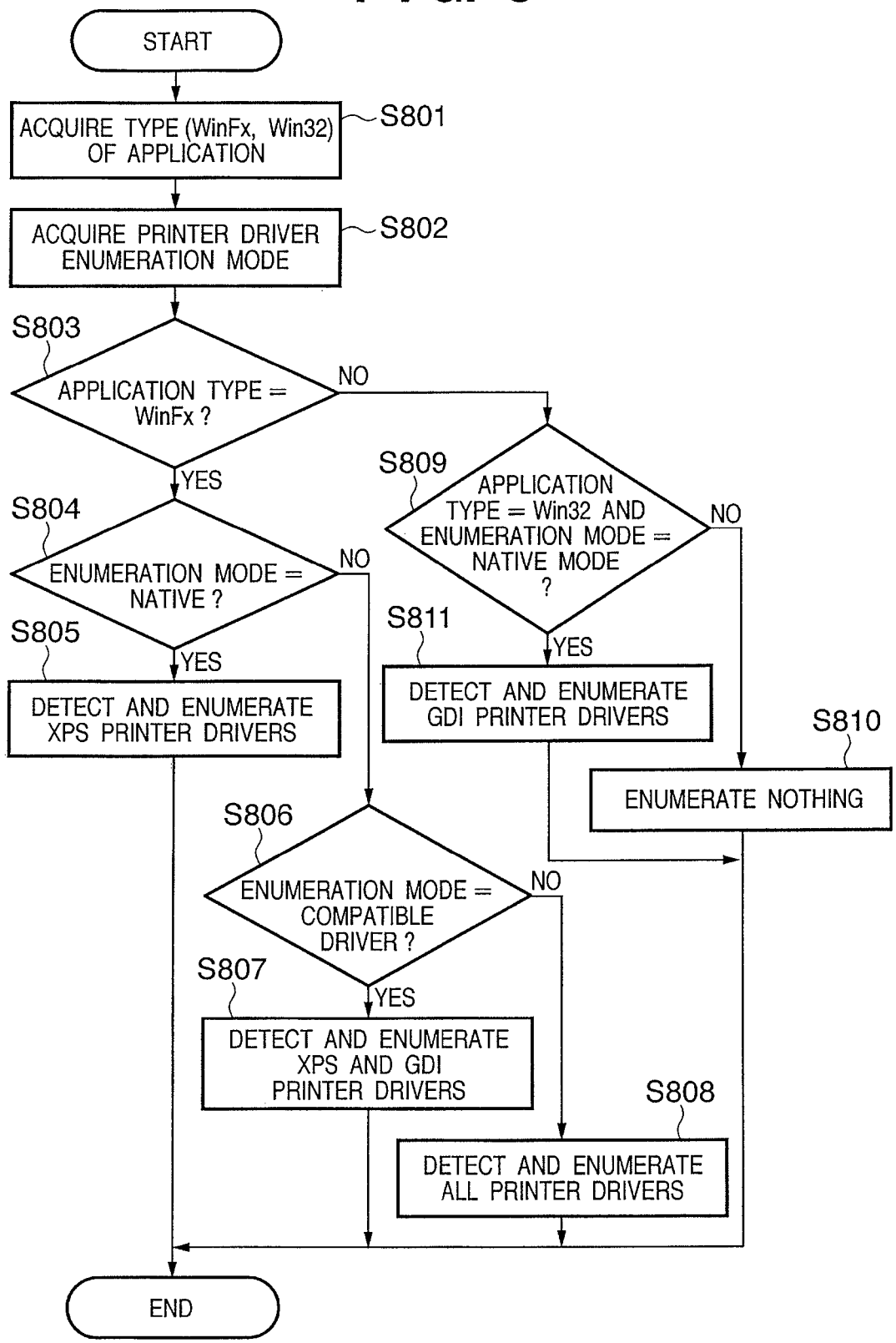
FIG. 8 is a flowchart for explaining the processing procedure of the printer driver enumeration display unit 500.

FIG. 8 is a flowchart for explaining the procedure of printer driver enumeration display processing which is implemented by the respective processing units of the printer driver enumeration display unit 500 by collaboration with the CPU 1.

In step S801, the printer driver enumeration unit 502 acquires attribute information used to identify whether the type of application used to generate print data is a WinFx application or Win32 application, so as to detect and enumerate suited printer drivers.

Figure 6:
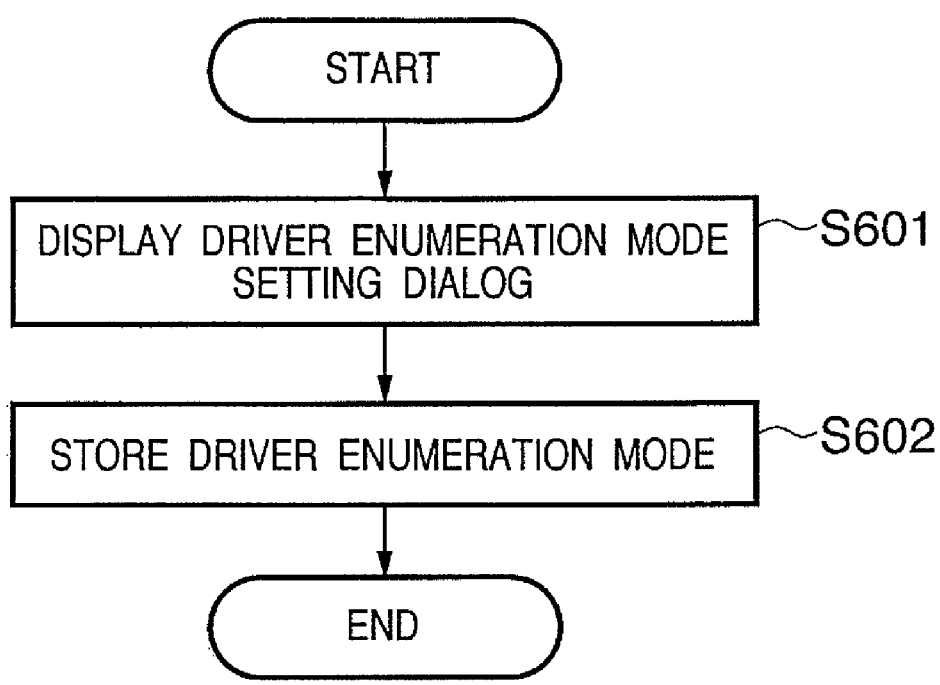
FIG. 6 is a flowchart for explaining the processing procedure of a printer driver enumeration mode setting unit 504.

In step S802, the printer driver enumeration unit 502 acquires the printer driver enumeration mode which is stored based on the user's settings in step S602 in FIG. 6.

In step S803, the printer driver enumeration unit 502 determines the type of application based on the attribute information used to identify it, acquired in step S801. That is, the unit 502 determines whether the type of application is a WinFx application (using the WPF graphics engine) or a Win32 application (using the GDI graphics engine).

If the application is determined to be WinFX in step S803, the process advances to step S804; if the application is determined to be Win32, the process advances to step S809.

In step S804, the printer driver enumeration unit 502 determines the printer driver enumeration mode acquired in step S802. If the enumeration mode is that of native printer drivers (701 in FIG. 7) (S804-Yes), the process advances to step S805. In step S805, the printer driver enumeration unit 502 detects XPS printer drivers and enumerates the detection results, and notifies the printer driver display unit 501 of the detection results. The printer driver display unit 501 displays the notified printer drivers (XPS drivers in this case), thus ending the processing.

Figure 9:
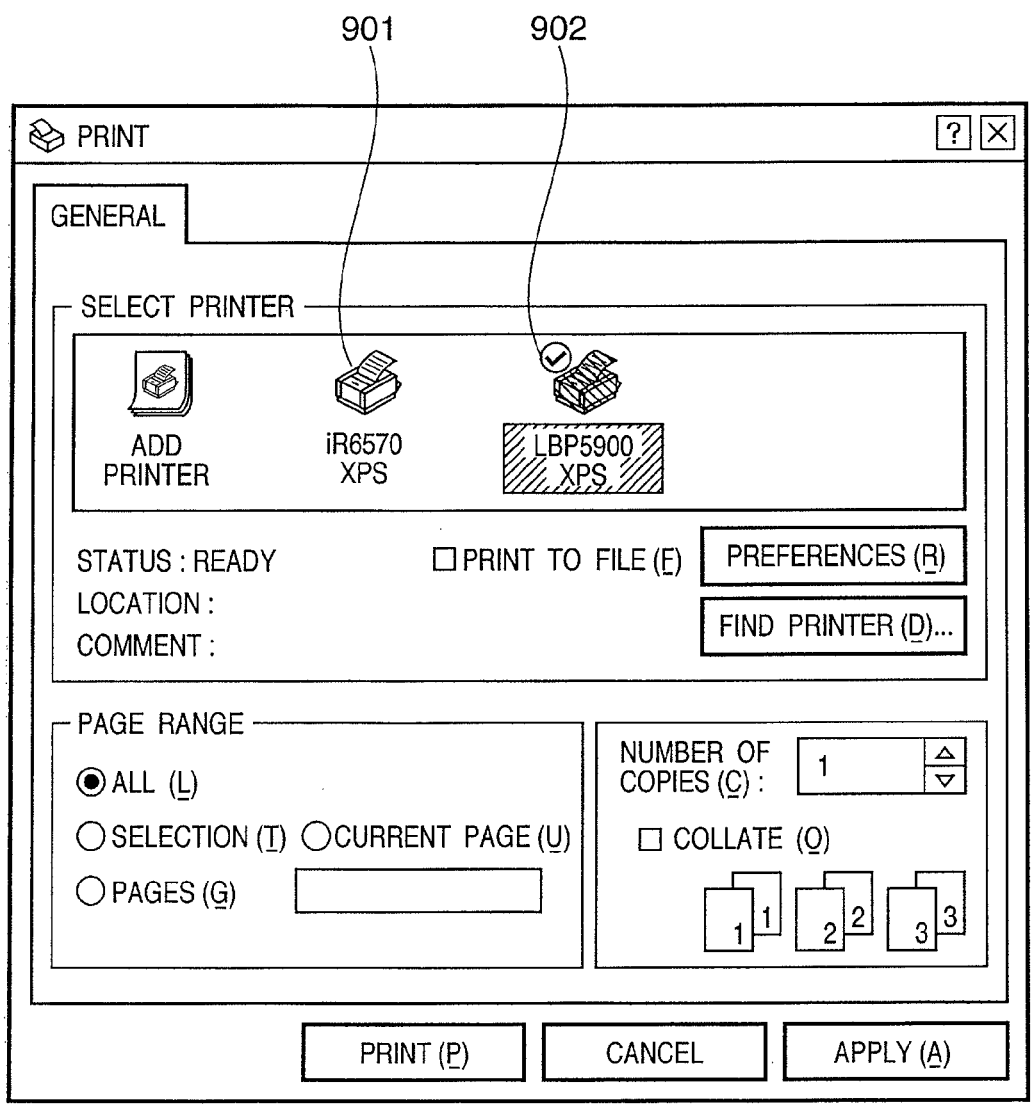
FIG. 9 shows a display example of a printer driver enumeration displayed when the user selects the display mode of only native drivers (recommended) on the printer driver enumeration mode setting user interface shown in FIG. 7.

FIG. 9 shows a display example of the printer driver enumeration displayed when the user selects the display mode (701) of only native drivers (recommended) on the printer driver enumeration mode setting user interface in FIG. 7. In this window, iR6570XPS (901) and LBP5900XPS (902) are enumerated as native printer drivers compliant to the WinFx application.

In order to visualize a more preferable printer driver, that printer driver may be selected (highlighted) and displayed. In this window, LBP5900XPS (902) is highlighted and displayed.

If it is determined in step S804 that the enumeration mode of printer drivers is other than that of native printer drivers (if the user selects the button 702 or 703 in FIG. 7) (S804—No), the process advances to step S806.

If it is determined in step S806 that the enumeration mode of compatible printer drivers is set (if the user selects the button 702 in FIG. 7), the process advances to step S807. In step S807, the printer driver enumeration unit 502 detects XPS printer drivers as those of the graphics engine that can be used in print processing of the WinFx application, and printer drivers, which have compatibility in terms of print functions and quality, of GDI printer drivers. The unit 502 then enumerates detection results, thus ending the processing.

Figure 10:
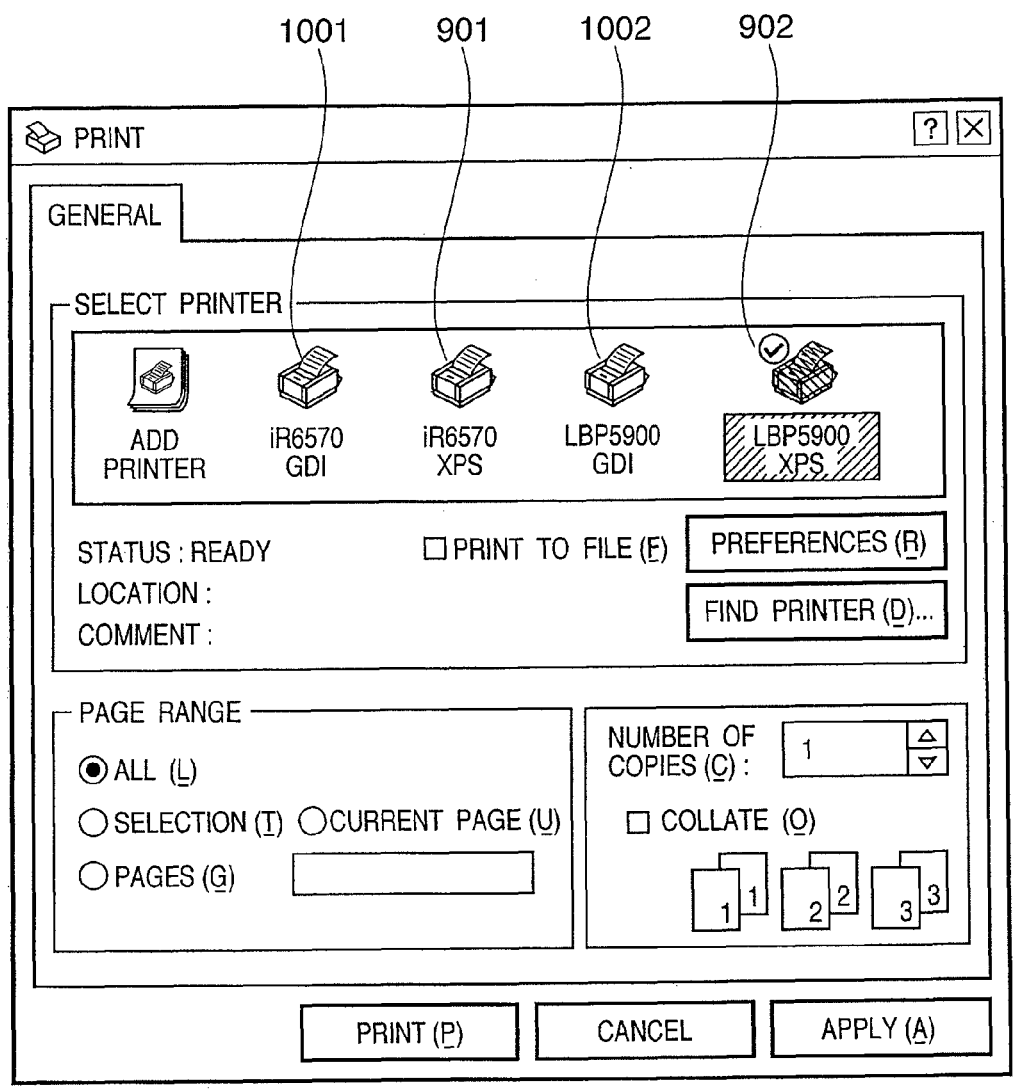
FIG. 10 shows a display example of the detection result displayed when the user selects a display mode of compatible printer drivers on the printer driver enumeration mode setting user interface shown in FIG. 7.

FIG. 10 shows a display example of the detection results when the user selects a display mode (702 in FIG. 7) of compatible printer drivers on the printer driver enumeration mode setting user interface in FIG. 7. In this window, iR6570XPS (901) and LBP5900XPS (902) are enumerated as native printer drivers compliant to the WinEx application. In addition to these drivers, Ir6570GDI (1001) and LBP5900GDI (1002) compliant to the Win32 application are also enumerated and displayed. In order to visualize a more preferable printer driver, that printer driver may be highlighted and displayed. In this window, LBP5900XPS (902) is highlighted and displayed as in FIG. 9.

On the other hand, if it is determined in step S806 that the enumeration mode is not that of compatible printer drivers, the process advances to step S808. Step S808 is the case wherein the user selects the display mode of all drivers on the user interface of FIG. 7 (when the user selects the button 703 in FIG. 7), and the printer driver enumeration unit 502 detects all printer drivers, and enumerates the detection results, thus ending the processing.

Referring back to step S803, if the type of application is the Win32 application (S803—No), the process advances to step S809. In step S809, the printer driver enumeration mode acquired in step S802 above is determined. If the type of application is the Win32 application, and the enumeration mode of native printer driver is set (S809-Yes), the process advances to step S811, and the printer driver enumeration unit 502 detects only GDI printer drivers and enumerates the detection results, thus ending the processing.

On the other hand, if it is determined in step S809 that the enumeration mode of native printer drivers is not set (S809— No), the process advances to step S810 and the processing ends without detecting any installed printer drivers. In this case, no printer drivers are enumerated as the detection results.

Figure 17:
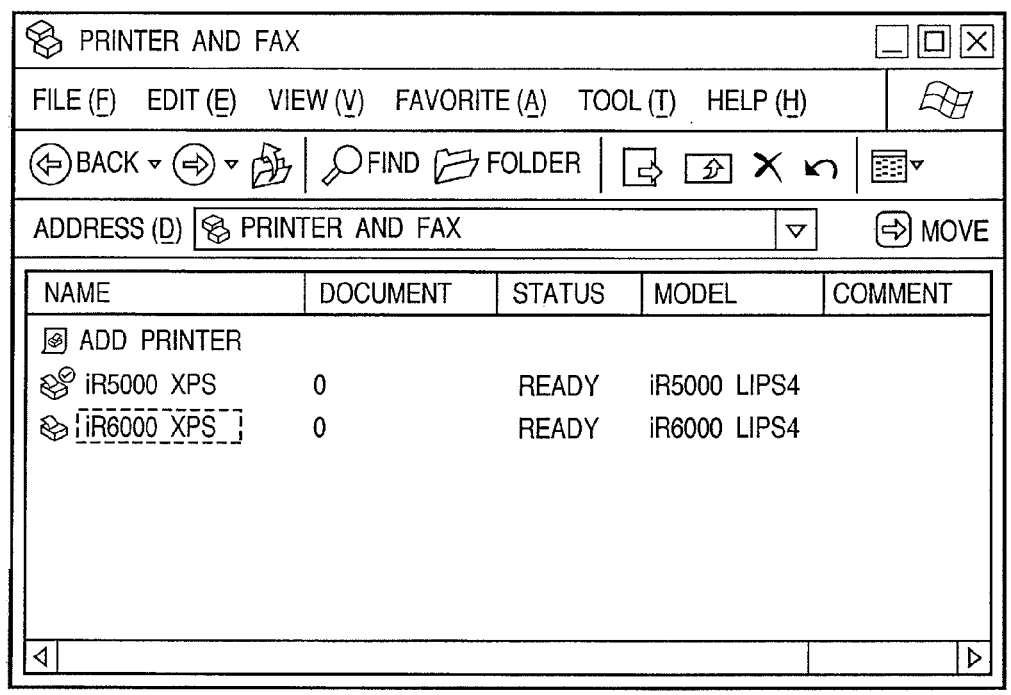
FIG. 17 shows a display example of detected printer drivers.
Figure 18:
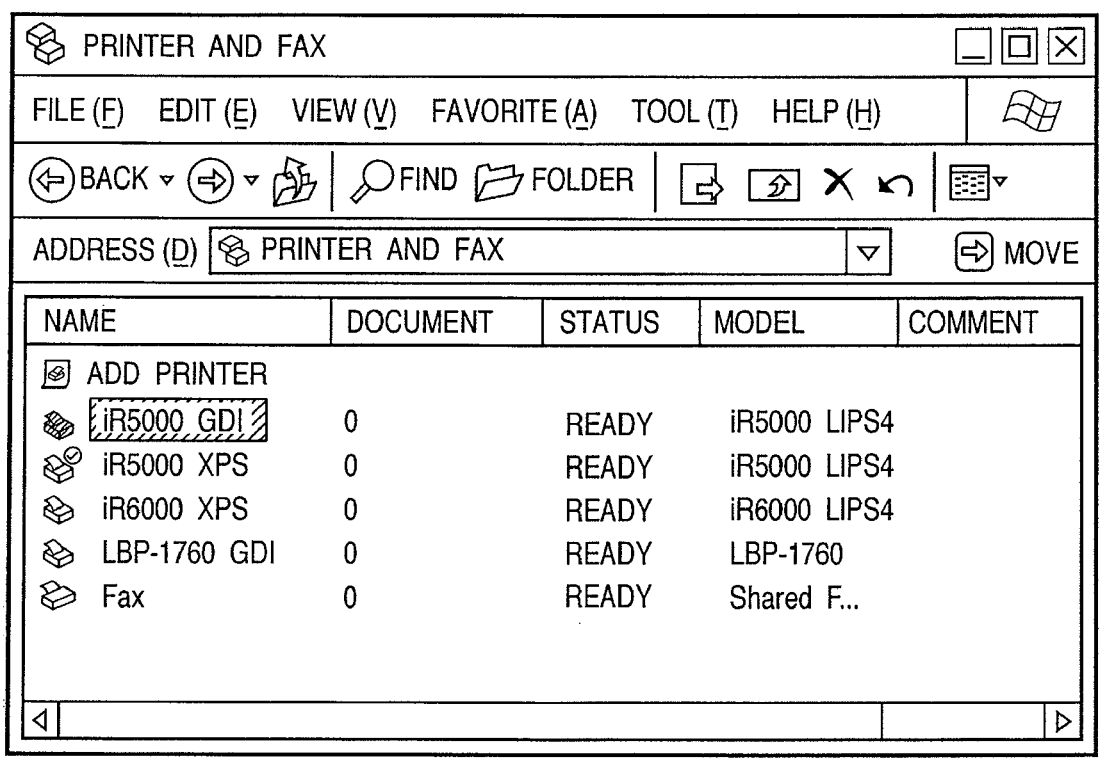
FIG. 18 shows a display example of detected printer drivers.

The arrangement of the printer driver enumeration display unit 500 described using FIG. 5 exemplifies that the application 101 includes the printer driver enumeration display unit 500 and its building components (501 to 505). However, the central point of this embodiment is not limited to such a specific arrangement. For example, an arrangement in which the printer driver enumeration display unit 500 may be included in the spooler 105 or OS 102. For example, when the printer driver enumeration display unit 500 is included in the spooler 105, the detection results of only native drivers are displayed, as shown in FIG. 17, and those of compatible printer drivers are displayed, as shown in FIG. 18.

If an arrangement which can acquire information of a graphics engine used by the application 101 and can acquire printer driver information provided by the spooler 105 is adopted, an arrangement in which the printer driver enumeration display unit 500 is not included in the application 101 may be adopted.

This embodiment exemplifies the information processing apparatus in which the WPF 212 and GDI 202 exist together as examples of different graphics engines, and which can install the XPS printer driver 213 and GDI printer driver 203. However, the central point of the present invention is not limited to such a specific example. For example, the present invention can be applied to an arrangement which includes another graphics engine, and an application and printer drivers compliant to such a graphic engine, in addition to the above arrangement. Furthermore, the present invention can be applied to an arrangement which includes three or more graphics engines, and applications and printer drivers compliant to these graphics engines.

Figure 16:
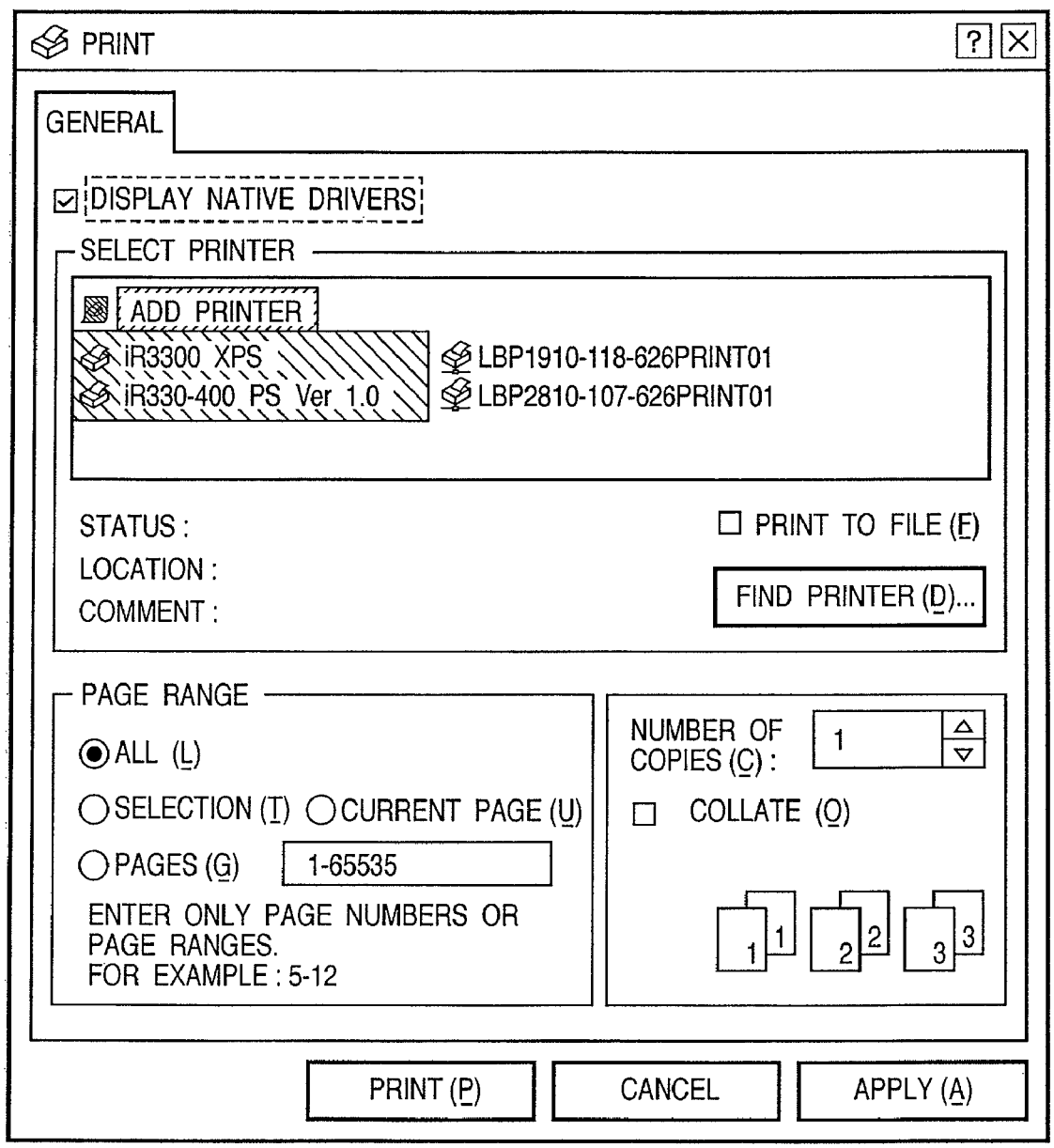
FIG. 16 shows a display example of detected printer drivers.

In the display example of the detection results of printer drivers in this embodiment, only printer drivers which match the type of application and the designated enumeration mode are enumerated, and those which do not match them are not displayed. In addition, as a modification example of display of the detection results, for example, when a plurality of printer drivers of different graphics engines are installed, as shown in FIG. 16, all these printer drivers may be displayed, and only those which meet the conditions may be identifiably displayed. As an example of identifiable display, printer drivers may be visually identifiable (e.g., by changing the background color, changing the display color of a printer driver of interest, and so forth) so that the ser can select a printer driver which meets the conditions.

According to this embodiment, in an arrangement in which a plurality of graphics engines exist together, and printer drivers of different graphics engines can be installed, printer drivers suited to an application can be easily selected.

Second Embodiment

This embodiment will explain an arrangement and method that display a default printer driver as a suited output destination in accordance with the printer driver enumeration mode set by the user in the arrangement described in the first embodiment. Since the arrangement according to this embodiment is the same as that according to the first embodiment, a description will be omitted to avoid a redundant description. As for the same processes, a description of those common to the processing according to the first embodiment will be omitted.

Figure 20B:
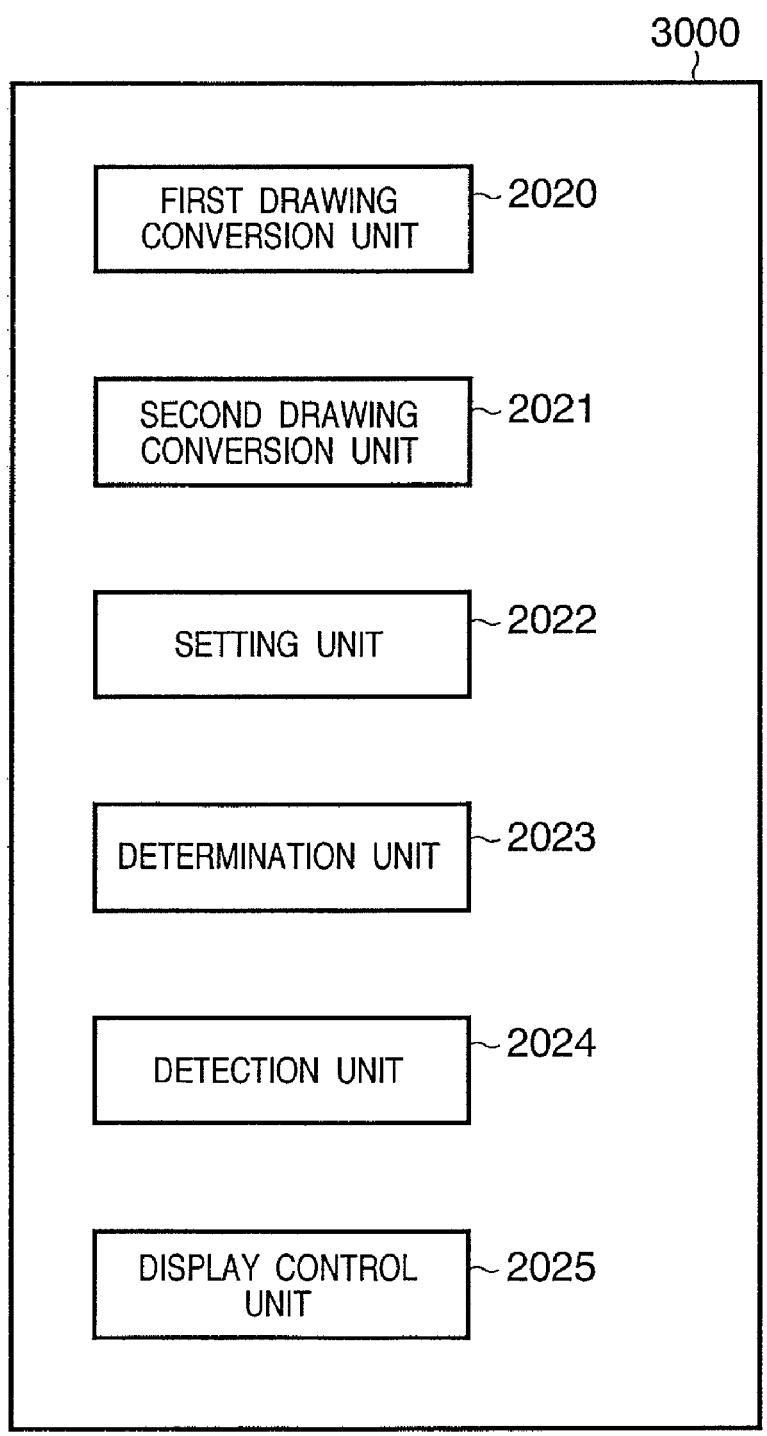

An information processing apparatus 3000 suited to this embodiment comprises a functional arrangement shown in FIG. 20B. A first drawing conversion unit 2020 converts first drawing information generated by an application of the first type into first print information which can be processed by a printer driver of the first type.

A second drawing conversion unit 2021 converts second drawing information generated by an application of the second type into second print information which can be processed by a printer driver of the second type.

A setting unit 2022 sets a default printer driver. The setting unit 2022 can set a default printer driver for each application of the first or second type. Also, the setting unit 2022 can set a default printer driver compliant to the application of the first or second type.

A determination unit 2023 determines the type of the application of the first or second type as an output source with respect to the printer driver of the first or second type as an output destination of the first or second print information.

A detection unit 2024 detects a default printer driver set by the setting unit 2022 with respect to the application of the first or second type determined by the determination unit 2023.

A display control unit 2025 highlights and displays printer drivers detected by the detection unit 2024 on a display window used to select a printer driver which serves as the output destination of the application of the first and second type as the output source.

The procedure of the processing for setting a default printer driver according to this embodiment will be described below with reference to the flowchart of FIG. 11. This processing is implemented by collaboration of the printer driver enumeration display unit 500 and CPU 1.

Figure 11:
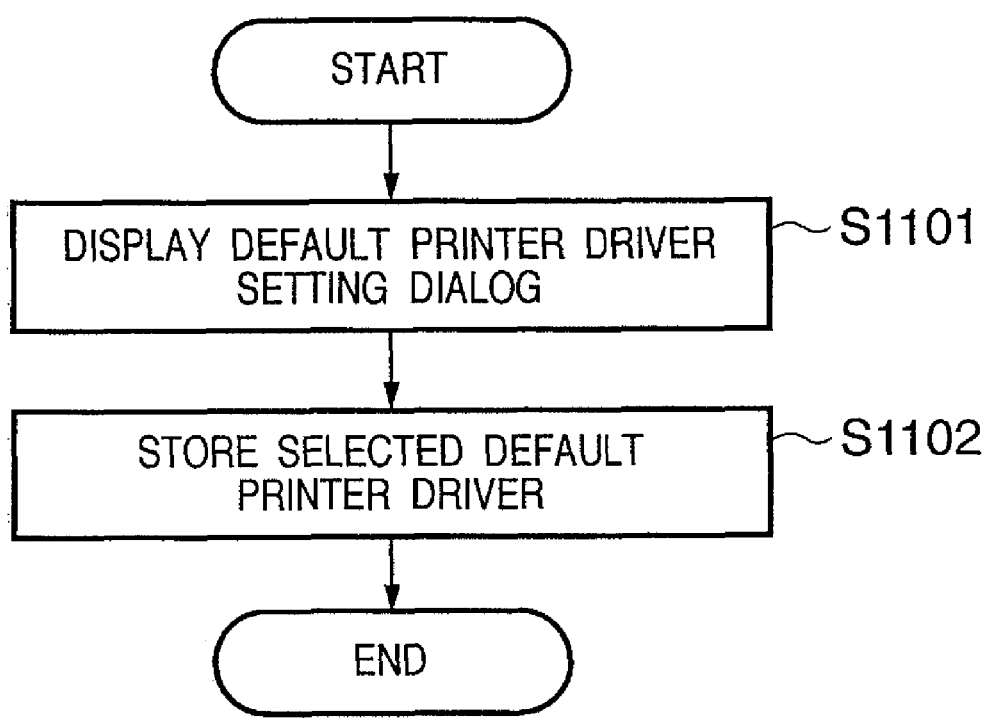
FIG. 11 is a schematic flowchart for explaining the processing procedure for displaying a default printer driver.

FIG. 11 is a schematic flowchart for explaining the procedure of the processing for displaying a default printer driver. In step S1101, a default printer driver setting dialog is displayed on the CRT 10. In step S1102 the selected printer driver is stored.

Figure 13:
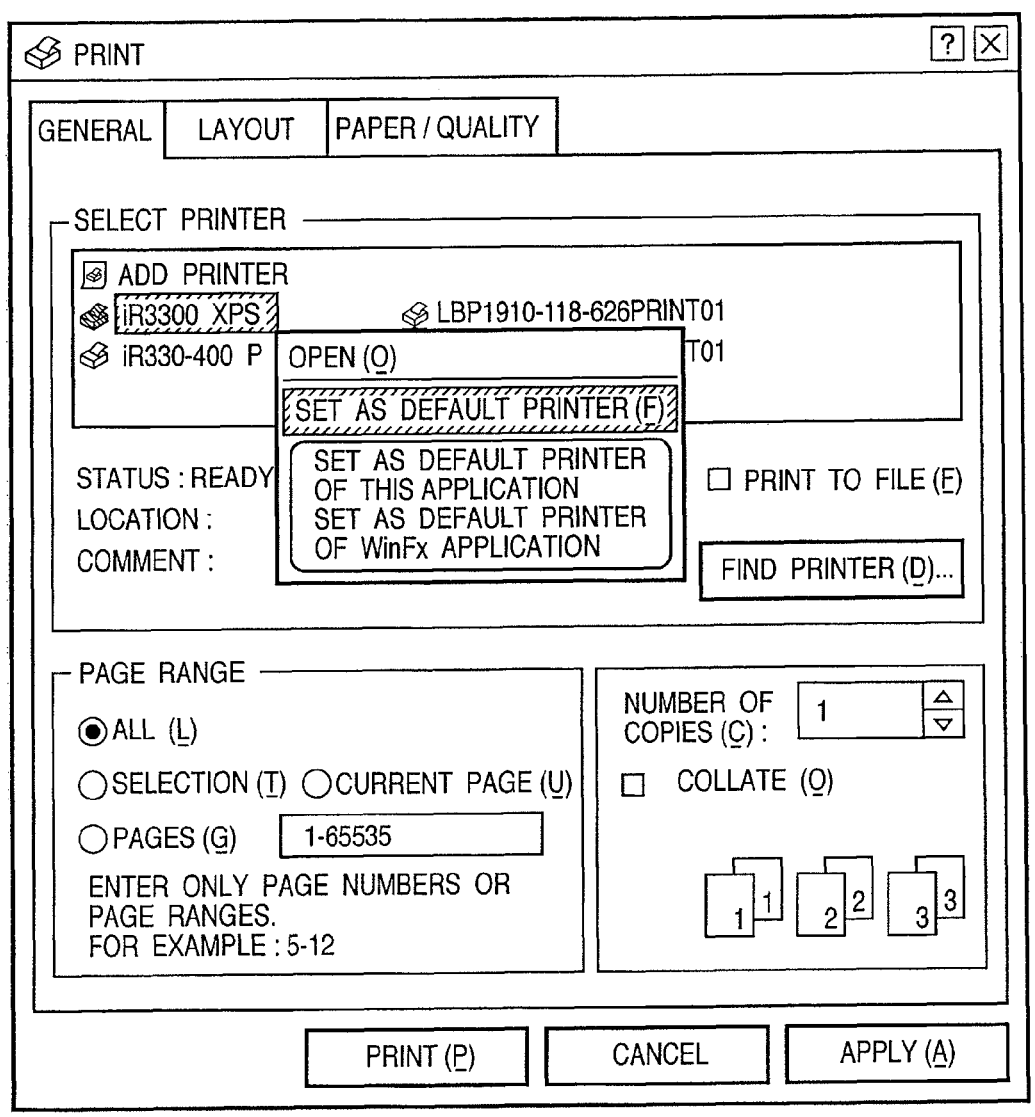
FIG. 13 shows an example of a user interface used to set a default printer driver.

FIG. 13 shows an example of a user interface used to set a default printer driver according to this embodiment. FIG. 13 exemplifies selection of a default printer driver upon printing. Alternatively, default printer drivers of graphics engines used in print processing may be selected from one user interface. The user interface in FIG. 13 exemplifies a case wherein iR3300XPS is selected as a default printer driver.

In step S1102, the default printer driver selected in step S1101 is stored in the printer driver enumeration unit 502, thus ending the processing.

FIG. 14 shows a storage example of application-dependent default printer drivers which are used for printing. Application names (1401) and default printers (1403) compliant to application operation modes (WinFx application or Win32 application) (1402) are stored.

FIG. 15 shows a storage example of graphics engine-dependent default printer drivers which are used for printing. Default printer drivers (1503, 1504) compliant to the WinFx application (1501) and Win32 application (1502) respectively, are stored in the printer driver enumeration unit.

Figure 12A:
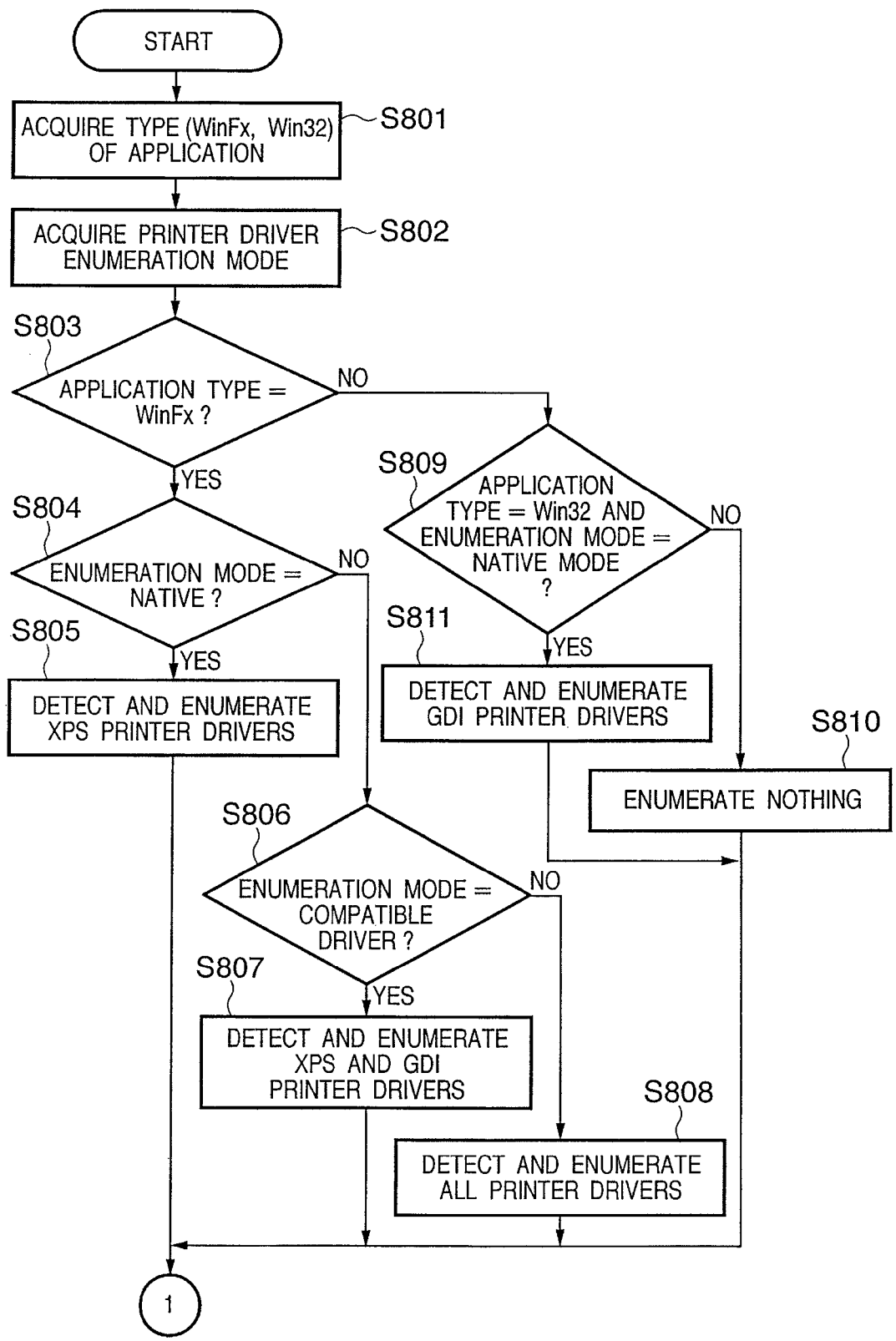
FIGS. 12A and 12B are flowcharts for explaining the processing procedure for displaying a default printer driver.

The procedure of the processing for displaying a default printer driver upon enumeration of printer drivers will be described below with reference to the flowcharts of FIGS. 12A and 12B. This processing is implemented by collaboration of the printer driver enumeration display unit 500 and CPU 1.

As has been explained in FIG. 8 (S801 to S811) of the first embodiment, suitable printer drivers are detected, and enumerated and displayed in accordance with the type of application and the printer driver enumeration mode. When a default printer driver is set to allow the user to further select a preferred printer driver from this enumeration display, it is displayed to notify the user of this.

After enumeration display, the process advances to step S1201 to check if default printer drivers for respective applications are stored (set) in step S1102 in FIG. 11. If default printer drivers for respective applications are set (S1201-Yes), the process advances to step S1202 to display the default printer drivers for respective applications on the CRT 10, thus ending the processing. Note that determination in step S1201 and display in step S1202 are based on information shown in FIG. 14.

Figure 19:
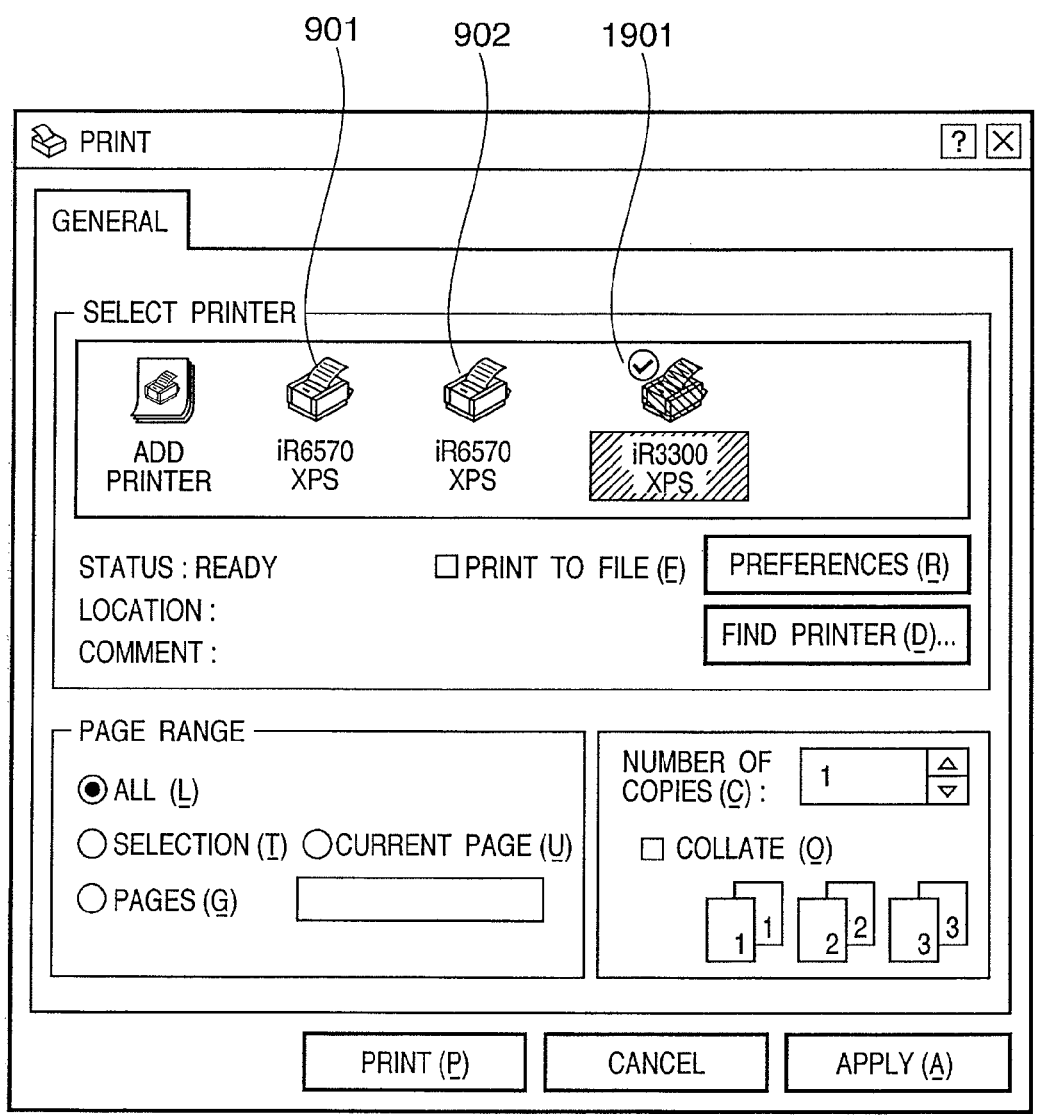
FIG. 19 shows a window for displaying a default printer driver set as an output destination suited to an application as an output source.

FIG. 19 shows an example of display of a default printer driver as the output destination suited to an application of the output source. In this display example, a default printer driver 1901 is added to printer drivers (901, 902) enumerated in step S805. The default printer driver (iR3300XPS) 1901 is selected on the user interface shown in FIG. 13. In order to visualize the default printer driver as a more preferable printer driver, it may be highlighted and displayed. As another display example of FIG. 19, the detection results may be narrowed down, and only the default printer driver 1901 may be displayed.

On the other hand, if it is determined in step S1201 that default printer drivers for respective applications are not stored (set) (S1201—No), the process advances to step S1203. It is checked in step S1203 if a default printer driver of a graphics engine used in print processing is stored (set). If the default printer driver of the graphics engine is set, the process advances to step S1204, and the default printer driver of the graphics engine of interest is displayed on the CRT 10, thus ending the processing. Note that determination in step S1203 and display in step S1204 are based on information shown in FIG. 15.

If it is determined in step S1203 that a default printer driver of a graphics engine used in print processing is not set (S1203—No), the process advances to step S1205. It is checked in step S1205 if a default printer driver of all printer drivers is registered. If a default printer driver is registered (S1205-Yes), the printer driver set as a default is displayed on the CRT 10, thus ending the processing (S1206). If it is determined in step S1205 that a default printer driver of all the printer drivers is not registered (S1205—No), the processing ends.

Figure 12B:
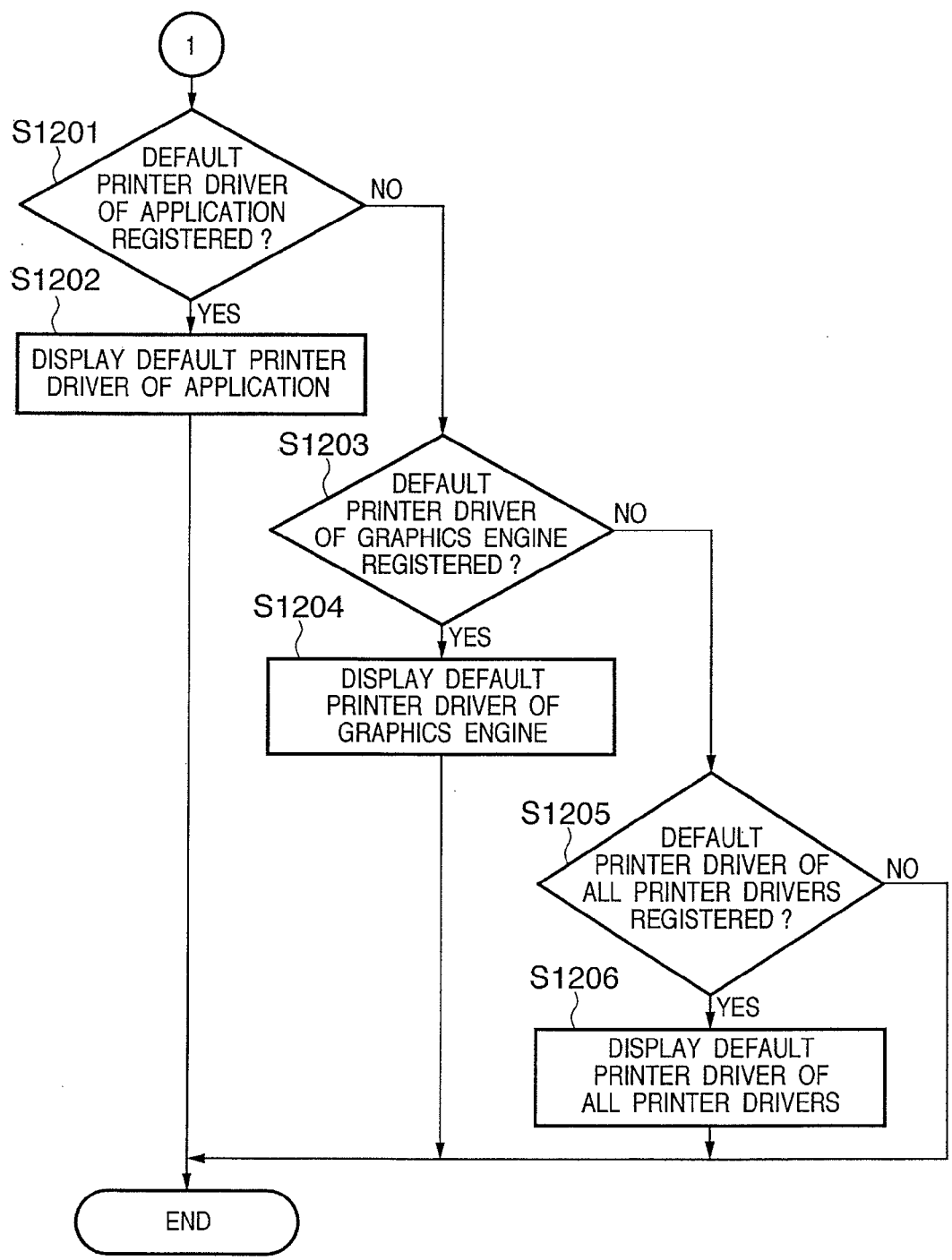

Note that determination of a default printer driver in steps S1201, S1203, and S1205 in FIG. 12B is not limited to this order, and the user may arbitrary select the priority order.

According to this embodiment, a default printer driver can be selected as a suitable output destination from enumerated printer drivers in accordance with an application or graphics engine to be used.

Another Embodiment

Note that the objects of the present invention are also achieved by supplying a storage medium, which records a program code of a software program that can implement the functions of the above-mentioned embodiments to a system or apparatus. Also, the objects are achieved by reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a flexible disk, hard disk, optical disk, magneto-optical disk, CD-ROM, CD-R, nonvolatile memory card, ROM, and the like may be used.

The functions of the above-mentioned embodiments may be implemented not only by executing the readout program code by the computer but also by some or all of actual processing operations executed by an OS (operating system) running on the computer based on an instruction of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-075546, filed Mar. 17, 2006, which is hereby incorporated by reference herein in its entirety.

What is claimed is:

1. An information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, comprising:
a determination unit configured to determine a type of application of the first type or the second type as output source with respect to the printer driver of the first type or the second type as an output destination of the first print information or the second print information;
a detection unit configured to detect printer drivers which match the type of application of the first type or the second type, determined by said determination unit, from printer drivers of the first type and printer drivers of the second type, which are installed in said information processing apparatus; and
a display control unit configured to display the printer drivers detected by said detection unit on a display for selecting a printer driver as the output destination of the application of the first type or the second type as the output source.

2. The information processing apparatus according to claim 1, further comprising a setting unit configured to set a display condition required to display the printer drivers detected by said detection unit on the display,
wherein said detection unit detects printer drivers that match the type of the application of the first type or the second type in accordance with the display condition set by said setting unit.

3. The information processing apparatus according to claim 1, including: a first straight-print processing system which has an application of the first type as the output source and a printer driver of the first type as the output destination;
a second straight-print processing system which has an application of the second type as the output source and a printer driver of the second type as the output destination;
a first cross-print processing system which has an application of the first type as the output source and a printer driver of the second type as the output destination; and a second cross-print processing system which has an application of the second type as the output source and a printer driver of the first type as the output destination,
wherein said determination unit determines that if the application of the first type serves as the output source, said detection unit detects printer drivers which configure the first straight-print processing system as suitable printer drivers, and
if said determination unit determines that the application of the second type serves as the output source, said detection unit detects printer drivers which configure the second straight-print processing system as suitable printer drivers.

4. The information processing apparatus according to claim 1, wherein if said determination unit determines that the application of the first type serves as the output source,
said detection unit detects printer drivers of the first type and printer drivers of the second type which are compatible to the printer drivers of the first type, as the output destination in accordance with a display condition requiring the display of compatible printer drivers.

5. The information processing apparatus according to claim 1, wherein if said determination unit determines that the application of the first type serves as the output source,
said detection unit detects printer drivers of the first type and printer drivers of the second type in accordance with a display condition requiring the display of all printer drivers.

6. The information processing apparatus according to claim 3, wherein if said determination unit determines that the application of the second type serves as the output source,
said detection unit does not detect printer drivers which configure the first straight-print processing system, the first cross-print processing system, and the second-cross print processing system as the output destination.

7. The information processing apparatus according to claim 4, wherein said display control unit identifiably displays printer drivers which meet the display condition and printer drivers which do not meet the display condition on the display.

8. The apparatus according to claim 1, wherein the application of the first type includes an application which uses a WinFx API, and
the application of the second type includes an application which uses a Win32 API.

9. An information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, comprising:
a setting unit configured to set a default printer driver;
a determination unit configured to determine a type of application of the first type or the second type as output source with respect to the printer driver of the first type or the second type as an output destination of the first print information or the second print information;
a detection unit configured to detect the default printer driver set by said setting unit with respect to the application of the first type or the second type determined by said determination unit; and
a display control unit configured to select and display the printer driver detected by said detection unit on a display for selecting a printer driver as the output destination of the application of the first type or the second type as the output source.

10. The apparatus according to claim 8, wherein said setting unit sets default printer drivers for respective applications which configure applications of the first type or the second type.

11. The apparatus according to claim 8, wherein said setting unit sets default printer drivers compliant to applications of the first type or the second type.

12. An information processing method for an information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, the method comprising:
   a determination step of determining a type of application of the first type or the second type as an output source with respect to the printer driver of the first type or the second type as an output destination of the first print information or the second print information;
   a detection step of detecting printer drivers which match the type of application of the first type or the second type determined in the determination step from printer drivers of the first type and printer drivers of the second type, which are installed in said information processing apparatus; and
   a display control step of displaying the printer drivers detected in the detection step on a display for selecting a printer driver as the output destination of the application of the first type or the second type as the output source.

13. The method according to claim 12, further comprising a display condition setting step of setting a display condition required for displaying the printer drivers detected by said detection step on the display, and
   wherein the detection step includes a step of detecting printer drivers that match the type of the application of the first type or the second type in accordance with the display condition set in the display condition setting step.

14. The method according to claim 12, wherein for use in an information processing apparatus including: a first straight-print processing system which has an application of the first type as the output source and a printer driver of the first type as the output destination;
   a second straight-print processing system which has an application of the second type as the output source and a printer driver of the second type as the output destination;
   a first cross-print processing system which has an application of the first type as the output source and a printer driver of the second type as the output destination; and
   a second cross-print processing system which has an application of the second type as the output source and a printer driver of the first type as the output destination,
   wherein said determination unit determines that if the application of the first type serves as the output source, said detection unit detects printer drivers which configure the first straight-print processing system as suitable printer drivers, and
   if said determination unit determines that the application of the second type serves as the output source, said detection unit detects printer drivers which configure the second straight-print processing system as suitable printer drivers,
   the detection step including:
   a step of detecting, if it is determined in the determination step that the application of the first type serves as the output source, printer drivers which configure the first straight-print processing system as suitable printer drivers, and
   a step of detecting, if it is determined in the determination step that the application of the second type serves as the output source, printer drivers which configure the second straight-print processing system as suitable printer drivers.

15. The method according to claim 12, wherein the detection step includes a step of detecting, if it is determined in the determination step that the application of the first type serves as the output source, printer drivers of the first type and printer drivers of the second type, which are compatible to the printer drivers of the first type, as the output destination in accordance with a display condition required to display compatible printer drivers.

16. The method according to claim 12, wherein the detection step includes a step of detecting, if it is determined in the determination step that the application of the first type serves as the output source, printer drivers of the first type and printer drivers of the second type in accordance with a display condition required to display all printer drivers.

17. The method according to claim 12, wherein the detection step includes a step of not detecting, if it is determined in the determination step that the application of the second type serves as the output source, printer drivers which configure the first straight print processing system, the first cross print processing system, and the second cross print processing system as the output destination.

18. The method according to claim 13, wherein the display control step includes a step of identifiably displaying printer drivers which meet the display condition and printer drivers which do not meet the display condition on the display.

19. The method according to claim 12, wherein the application of the first type includes an application which uses a WinFx API, and
   the application of the second type includes an application which uses a Win32 API.

20. A program which when loaded into a programmable information processing apparatus and executed performs a method as claimed in claim 12.

21. A machine readable storage medium storing a program as claimed in claim 20.

22. An information processing method for an information processing apparatus which comprises a first drawing conversion unit configured to convert first drawing information generated by an application of a first type into first print information which can be processed by a printer driver of a first type, and a second drawing conversion unit configured to convert second drawing information generated by an application of a second type into second print information which can be processed by a printer driver of a second type, the method comprising:
   a setting step of setting a default printer driver;
   a determination step of determining a type of application of the first type or the second type as an output source with respect to the printer driver of the first type or the second type as an output destination of the first print information or the second print information;

a detection step of detecting the default printer driver set by said setting step with respect to the application of the first type or the second type determined in the determination step; and a display control step of selecting and displaying the printer driver detected in the detection step on a display for selecting a printer driver as the output destination of the application of the first type or the second type as the output source.

23. The method according to claim 22, wherein the setting step includes a step of setting default printer drivers for respective applications which configure applications of the first type or the second type.

24. The method according to claim 22, wherein the setting step includes a step of setting default printer drivers compliant to applications of the first type or the second type.

25. A program which when loaded into a programmable information processing apparatus and executed performs a method as claimed in claim 22.

26. A machine readable storage medium storing a program as claimed in claim 25.

* * * * *